United States Patent
Xie et al.

(10) Patent No.: US 10,887,067 B2
(45) Date of Patent: Jan. 5, 2021

(54) CODING SCHEME DETERMINING METHOD AND APPARATUS

(71) Applicant: HUAWEI TECHNOLOGIES CO., LTD., Shenzhen (CN)

(72) Inventors: Yong Xie, Shenzhen (CN); Jun Chen, Beijing (CN); Yalin Liu, Shenzhen (CN); Rongdao Yu, Shenzhen (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/427,316

(22) Filed: May 30, 2019

(65) Prior Publication Data
US 2019/0288818 A1    Sep. 19, 2019

Related U.S. Application Data

(63) Continuation of application No. PCT/CN2017/107489, filed on Oct. 24, 2017.

(30) Foreign Application Priority Data

Nov. 30, 2016    (CN) .......................... 2016 1 1094694

(51) Int. Cl.
*H04L 5/00*    (2006.01)
*H04L 1/00*    (2006.01)
(Continued)

(52) U.S. Cl.
CPC .......... *H04L 5/0053* (2013.01); *H04L 1/0009* (2013.01); *H04L 1/0025* (2013.01);
(Continued)

(58) Field of Classification Search
CPC ... H04L 5/0053; H04L 1/0009; H04L 1/0025; H04L 1/0041; H04L 1/0057
See application file for complete search history.

(56) References Cited

U.S. PATENT DOCUMENTS

2005/0149841 A1* 7/2005 Kyung .................. H04L 1/0003
 714/800
2006/0227778 A1* 10/2006 Jin ......................... H04L 1/0028
 370/389

(Continued)

FOREIGN PATENT DOCUMENTS

CN    101299632 A    11/2008
CN    101835098 A     9/2010
(Continued)

OTHER PUBLICATIONS

ZTE, "Consideration on channel coding for NR", 3GPP TSG RAN WG1 #86 R1-166413, Gothenburg, Sweden, Aug. 22-26, 2016, total 12 pages.

(Continued)

*Primary Examiner* — Jael M Ulysse
(74) *Attorney, Agent, or Firm* — Kilpatrick Townsend & Stockton LLP

(57) ABSTRACT

A coding scheme determining method and apparatus are provided. In various embodiments, a base station device sends, to a terminal device, higher layer control signaling, physical layer control signaling, or a synchronization signal that carries coding scheme indication information. In some embodiments, a terminal device sends, to a base station device, a capability information report message that carries coding scheme indication information, so that the base station device or the terminal device can clearly and flexibly indicate a coding scheme. At least one information block size IBS greater than or equal to a preset first specified value X is determined, and an IBS is selected from the at least one IBS to code an information block of bits or a code block of the information block of bits. X and a coding scheme are determined by a scenario, information type, and/or service type.

12 Claims, 11 Drawing Sheets

| Code rate (R) | LDPC information block size/length (bits) | LDPC code length (bits) |
|---|---|---|
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

(51) Int. Cl.
*H04W 56/00* (2009.01)
*H04W 72/04* (2009.01)

(52) U.S. Cl.
CPC .......... *H04L 1/0041* (2013.01); *H04L 1/0057* (2013.01); *H04L 1/0059* (2013.01); *H04L 1/0072* (2013.01); *H04L 1/0075* (2013.01); *H04W 56/001* (2013.01); *H04W 72/0413* (2013.01); *H04W 72/0446* (2013.01)

(56) References Cited

U.S. PATENT DOCUMENTS

| | | | |
|---|---|---|---|
| 2007/0162814 A1* | 7/2007 | Shen | H03M 13/116 714/752 |
| 2008/0273644 A1 | 11/2008 | Chesnutt et al. | |
| 2009/0033524 A1 | 2/2009 | Tiirola et al. | |
| 2010/0040163 A1* | 2/2010 | Caire | H04L 1/0003 375/261 |
| 2010/0162078 A1* | 6/2010 | Miller | H04L 1/0017 714/755 |
| 2011/0310853 A1* | 12/2011 | Yin | H04L 5/0023 370/335 |
| 2012/0327871 A1* | 12/2012 | Ghosh | H04L 1/0041 370/329 |
| 2013/0028192 A1* | 1/2013 | Cheng | H04L 5/0098 370/328 |
| 2013/0142138 A1* | 6/2013 | Dinan | H04L 5/0044 370/329 |
| 2013/0324138 A1 | 12/2013 | Chang et al. | |
| 2014/0045497 A1* | 2/2014 | Abe | H04L 1/0067 455/435.1 |
| 2014/0247801 A1 | 9/2014 | Oizumi et al. | |
| 2015/0063280 A1* | 3/2015 | Nan | H04L 1/0058 370/329 |
| 2015/0163682 A1* | 6/2015 | Zarifi | H04W 16/26 455/446 |
| 2015/0263796 A1* | 9/2015 | Nam | H04B 7/0452 370/329 |
| 2015/0312787 A1* | 10/2015 | Das | H04W 36/0033 370/331 |
| 2016/0173232 A1* | 6/2016 | Mallik | H04L 1/0009 714/800 |
| 2016/0241682 A1* | 8/2016 | Xu | H04L 1/0068 |
| 2016/0249404 A1* | 8/2016 | Hoglund | H04B 7/2643 |
| 2017/0026976 A1* | 1/2017 | Yoo | H04W 72/042 |
| 2018/0092068 A1* | 3/2018 | Nammi | H04L 5/0053 |
| 2018/0234155 A1* | 8/2018 | Neuhaus | H04L 1/0026 |

FOREIGN PATENT DOCUMENTS

| | | |
|---|---|---|
| CN | 103427954 A | 12/2013 |
| CN | 103503495 A | 1/2014 |
| CN | 103891341 A | 6/2014 |
| EP | 0863682 A1 | 9/1998 |
| JP | 2008535439 A | 8/2008 |
| WO | 2016163941 A1 | 10/2016 |

OTHER PUBLICATIONS

3GPP TS 36.212 V14.0.0 (Sep. 2016); 3rd Generation Partnership Project; Technical Specification Group Radio Access Network; Evolved Universal Terrestrial Radio Access (E-UTRA); Multiplexing and channel coding(Release 14); total 148 pages.
NTT DOCOMO, "Evaluation of LDPC codes for eMBB", 3GPP TSG RAN WG1 Meeting #86bis R1-1610059, Lisbon, Portugal Oct. 10-14, 2016, total 4 pages.
IEEE Std 8002.11n-2009, Part 11: Wireless LAN Medium Access Control (MAC) and Physical Layer Specifications, Amendment 5: Enhancements for Higher Throughput, total 539 pages.
3GPP TSG RAN WG1 #87,R1-1613268:"Selection of eMBB Coding Scheme for Short Block length", ZTE, ZTE Microelectronics,Reno, US, Nov. 14-18, 2016,total 10 pages.

\* cited by examiner

| Code rate (R) | LDPC information block size/length (bits) | LDPC code length (bits) |
|---|---|---|
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

FIG. 1

| Scenario | Enhanced Mobile Broadband eMBB | Massive Machine-Type Communications mMTC | Ultra-Reliable and Low-Latency Communications URLLC |
|---|---|---|---|
| Coding type | | Convolutional codes | Convolutional codes |
| | Low-density parity-check code LDPC | LDPC | LDPC |
| | Polar | Polar | Polar |
| | Turbo | Turbo | Turbo |

FIG. 2

| Coding type | Information block size IBS (quantity of bits) |
|---|---|
| LDPC | 324, 432, 1620, or the like |
| Polar | 128, 256, or the like |
| Turbo | 40, 48, 64, or the like |
| Convolutional codes | 20, 30, 31, or the like |

(a) Applicable to a scenario, information type, and/or service type

| Coding type | Information block size IBS (quantity of bits) |
|---|---|
| LDPC | 1024, 1620, 2048, or the like |
| Polar | 256, 432, 972, or the like |
| Turbo | 64, 120, 128, 192, or the like |
| Convolutional codes | 10, 20, 30, 40, or the like |

(b) Applicable to another scenario, information type, and/or service type

FIG. 9

CODING SCHEME DETERMINING METHOD AND APPARATUS

CROSS-REFERENCE TO RELATED APPLICATIONS

This application is a continuation of International Application No. PCT/CN2017/107489, filed on Oct. 24, 2017, which claims priority to Chinese Patent Application No. 201611094694.5, filed on Nov. 30, 2016. The disclosures of the aforementioned applications are hereby incorporated by reference in their entireties.

TECHNICAL FIELD

The present invention relates to the field of communications technologies, and in particular, to a coding scheme determining method and apparatus.

BACKGROUND

Future 5th Generation (5th-Generation, 5G) needs to support a huge mobile data traffic growth, massive device connections, and various new services and application scenarios. For example, the 3GPP (Third Generation Partnership Project, 3rd Generation Partnership Project) determines three typical application scenarios, including: Enhanced Mobile Broadband (Enhanced Mobile Broadband, eMBB), Massive Machine-Type Communications (Massive Machine Type Communications, mMTC), and Ultra-Reliable and Low-Latency Communications (Ultra-Reliable and Low Latency Communications, URLLC). A 5G system needs better performance, for example, a larger system capacity, a lower latency, higher network reliability, and higher network availability. The 5G system can conveniently achieve a purpose of intellectual interconnection between people and everything.

Better performance of a future 5G mobile communications system may be implemented with help of an advanced channel coding technology. For example, the 3GPP determines candidate coding types of the 5G system, including: polar codes, turbo codes, low-density parity-check codes (Low Density Parity Check Code, LDPC), convolutional codes (Convolutional Codes, CC), and the like.

Currently, there are a plurality of LDPC coding schemes for LDPC codes. For example, in a schematic diagram of LDPC coding schemes shown in FIG. 1, the IEEE Std 802.11n standard (2009) provides 12 LDPC coding schemes with respect to four code rates (1/2, 2/3, 3/4, and 5/6), and each code rate has three information block sizes (Information Block Size, IBS).

There are also a plurality of turbo coding schemes for turbo codes. For example, one code rate (1/3) and 188 information block sizes are provided for turbo coding schemes in the 3GPP TS 36.212 (2009) standard.

At present, there are also a plurality of coding schemes for each of polar codes and convolutional codes.

For typical scenarios such as eMMB, mMTC, and URLLC, a suitable coding type needs to be selected to implement better performance. For example, a proposal of the 3GPP 86bis Meeting (R1-1610059) provides three combination options, as shown in a schematic diagram of coding type combinations applicable to typical scenarios in FIG. 2. For example, coding types corresponding to eMBB include LDPC codes, polar codes, and turbo codes, coding types corresponding to mMTC include convolutional codes, LDPC codes, polar codes, and turbo codes, and coding types corresponding to URLLC include convolutional codes, LDPC codes, polar codes, and turbo codes.

There are many candidate coding types for the 5G system above. Each combination option includes a plurality of coding types. In addition, each candidate coding type may be further classified into a plurality of coding schemes. However, a clear method for selecting and using these coding schemes during data transmission is lacked and a method for flexibly using such a large quantity of coding schemes is also lacked during data transmission.

SUMMARY

Embodiments of the present invention provide a coding scheme determining method and apparatus, so that a coding scheme is clearly and flexibly indicated or a suitable coding scheme is determined during information transmission.

According to a first aspect, a coding scheme determining method is provided, and the method includes:

sending, by a base station device, higher layer control signaling, physical layer control signaling, or a synchronization signal to a terminal device, where the higher layer control signaling, the physical layer control signaling, or the synchronization signal includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

In this implementation, the base station device sends, to the terminal device, the higher layer control signaling, the physical layer control signaling, or the synchronization signal that carries the coding scheme indication information. The coding scheme indication information is used to indicate the coding scheme of the information block of bits, so that the terminal device can clearly and flexibly indicate the coding scheme.

In a first possible implementation, the higher layer control signaling includes radio resource control RRC signaling, and the physical layer control signaling includes downlink control information DCI and uplink control information UCI.

In a second possible implementation, the information block of bits includes at least one of the following information types: control information and data information.

In this implementation, coding schemes of the control information and the data information can be indicated.

In a third possible implementation, the control information includes system information and channel quality information CQI.

According to a second aspect, a base station device is provided. The base station device has a function of implementing behavior of the base station device in the foregoing method. The function may be implemented by hardware, or may be implemented by hardware executing corresponding software. The hardware or software includes one or more modules corresponding to the foregoing function.

In a possible implementation, the base station device includes a sending unit, where the sending unit is configured to send higher layer control signaling, physical layer control signaling, or a synchronization signal to a terminal device, where the higher layer control signaling, the physical layer control signaling, or the synchronization signal includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

In another possible implementation, the base station device includes a transmitter, where the transmitter is configured to send higher layer control signaling, physical layer control signaling, or a synchronization signal to a terminal device, where the higher layer control signaling, the physical layer control signaling, or the synchronization signal includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

Based on a same inventive concept, for principles of resolving the problem by the apparatus and beneficial effects of the apparatus, refer to the first aspect, the possible implementations of the first aspect, and beneficial effects thereof. Therefore, for implementation of the apparatus, refer to implementation of the method. Repeated descriptions are not described again.

According to a third aspect, a coding scheme determining method is provided, and the method includes:

receiving, by a terminal device, a capability negotiation request message of a base station device; and sending, by the terminal device, a capability information report message to the base station device, where the capability information report message includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

In this implementation, the terminal device sends, to the base station device, the capability information report message that carries the coding scheme indication information. The coding scheme indication information is used to indicate the coding scheme of the information block of bits, so that the base station device can clearly and flexibly indicate the coding scheme.

In a first possible implementation, the information block of bits includes at least one of the following information types: control information and data information.

In this implementation, coding schemes of the control information and the data information can be indicated.

In a second possible implementation, the control information includes system information and channel quality information CQI.

According to a fourth aspect, a terminal device is provided. The terminal device has a function of implementing behavior of the terminal device in the foregoing method. The function may be implemented by hardware, or may be implemented by hardware executing corresponding software. The hardware or software includes one or more modules corresponding to the foregoing function.

In a possible implementation, the terminal device includes a receiving unit and a sending unit, where the receiving unit is configured to receive a capability negotiation request message of a base station device; and the sending unit is configured to send a capability information report message to the base station device, where the capability information report message includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

In another possible implementation, the terminal device includes a receiver and a transmitter, where the receiver is configured to receive a capability negotiation request message of a base station device; and the transmitter is configured to send a capability information report message to the base station device, where the capability information report message includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

Based on a same inventive concept, for principles of resolving the problem by the apparatus and beneficial effects of the apparatus, refer to the third aspect, the possible implementations of the third aspect, and beneficial effects thereof. Therefore, for implementation of the apparatus, refer to implementation of the method. Repeated descriptions are not described again.

According to a fifth aspect, a coding scheme determining method is provided, and the method includes:

determining at least one information block size IBS that is greater than or equal to a preset first specified value X, where X is set based on a corresponding scenario, information type, and/or service type, and each scenario, information type, and/or service type is corresponding to at least one IBS; and selecting an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS; where a coding scheme is determined by the scenario, information type, and/or service type, and the coding scheme includes at least one of the following coding types: polar codes, turbo codes, low-density parity-check LDPC codes, convolutional codes, block codes, and repetition codes.

In this implementation, a lower threshold of an information block size is determined based on a corresponding scenario, information type, and/or service type. Then, an information block size is selected from at least one information block size greater than or equal to X based on a limitation condition between an information block size and a size of an information block of bits or a size of a code block, to code the information block of bits or the code block based on the selected information block size. Because a coding scheme corresponding to the selected information block size is determined based on a scenario, information type, and/or service type, a suitable coding scheme can be determined based on the scenario, information type, and/or service type.

In a first possible implementation, each coding type is corresponding to one IBS set, each IBS set includes at least one IBS, and each IBS is corresponding to one coding scheme.

In this implementation, IBSs are classified by set according to coding types. Each IBS is corresponding to one coding scheme, so that an IBS can be selected based on a coding type.

In a second possible implementation, the method further includes:

if the size of the information block of bits is greater than a preset second specified value Y, segmenting the information block of bits based on the second specified value and a principle that a quantity of padded bits is smallest, to obtain a plurality of code blocks of a same size, where Y is set based on a corresponding scenario, information type, and/or service type; and the selecting an IBS from the at least one IBS to code a code block of the information block of bits includes:

selecting a first information block size IBS1 to code the plurality of code blocks, where the IBS1 is a sum of a code block size CBS of the code block and the quantity of padded bits, and the quantity of padded bits is an integer greater than or equal to 0.

In this implementation, the information block of bits is segmented into the plurality of code blocks of a same size, to use one information block size to code the plurality of code blocks obtained through segmentation. A segmentation manner is simple and the quantity of padded bits is smallest, thereby reducing bit padding overheads.

In a third possible implementation, the method further includes:

if the size of the information block of bits is greater than a preset third specified value Z, segmenting the information block of bits based on the third specified value and a principle that a quantity of padded bits is smallest, to obtain a plurality of code blocks of different sizes, where Z is set based on a corresponding scenario, information type, and/or service type; and the selecting an IBS from the at least one IBS to code a code block of the information block of bits includes:

selecting a plurality of second information block sizes IBS2 to code the plurality of code blocks, where each IBS2 is a sum of a code block size CBS of each code block and the quantity of padded bits, and the quantity of padded bits is an integer greater than or equal to 0.

In this implementation, the information block of bits is segmented into the plurality of code blocks of different sizes, to use a plurality of IBSs to code the plurality of code blocks. In this way, coding schemes are diversified, coding can be flexibly performed, and the quantity of padded bits is smallest, thereby reducing bit padding overheads.

In a fourth possible implementation, the method further includes:

determining a selected LDPC code rate and a largest IBS of LDPC codes corresponding to the selected LDPC code rate; where the second specified value or the third specified value is the largest IBS of the LDPC codes corresponding to the selected LDPC code rate, and a coding type corresponding to the coding scheme is LDPC codes.

In this implementation, it is determined that the coding type is LDPC codes, and the LDPC code rate is selected. One code rate has one largest IBS, and the information block of bits is segmented based on the largest IBS.

In a fifth possible implementation, the information block of bits includes at least one of the following information types: control information and data information.

In this implementation, coding schemes of the control information and the data information can be indicated.

In a sixth possible implementation, the control information includes system information and channel quality information CQI.

According to a sixth aspect, a coding scheme determining apparatus is provided. The apparatus has a function of implementing behavior of the apparatus in the foregoing method. The function may be implemented by hardware, or may be implemented by hardware executing corresponding software. The hardware or software includes one or more modules corresponding to the foregoing function.

In a possible implementation, the coding scheme determining apparatus includes a determining unit and a selection unit, where the determining unit is configured to determine at least one information block size IBS that is greater than or equal to a preset first specified value X, where X is set based on a corresponding scenario, information type, and/or service type, and each scenario, information type, and/or service type is corresponding to at least one IBS; and the selection unit is configured to select an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS; where a coding scheme is determined by the scenario, information type, and/or service type, and the coding scheme includes at least one of the following coding types: polar codes, turbo codes, low-density parity-check LDPC codes, convolutional codes, block codes, and repetition codes.

In another possible implementation, the coding scheme determining apparatus includes a processor, where the processor is configured to determine at least one information block size IBS that is greater than or equal to a preset first specified value X, where X is set based on a corresponding scenario, information type, and/or service type, and each scenario, information type, and/or service type is corresponding to at least one IBS; and the processor is further configured to select an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS; where a coding scheme is determined by the scenario, information type, and/or service type, and the coding scheme includes at least one of the following coding types: polar codes, turbo codes, low-density parity-check LDPC codes, convolutional codes, block codes, and repetition codes.

Based on a same inventive concept, for principles of resolving the problem by the apparatus and beneficial effects of the apparatus, refer to the fifth aspect, the possible implementations of the fifth aspect, and beneficial effects thereof. Therefore, for implementation of the apparatus, refer to implementation of the method. Repeated descriptions are not described again.

DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 1 is a schematic diagram of an example LDPC coding scheme;

FIG. 2 is a schematic diagram of a coding type combination applicable to a typical scenario;

FIG. 9 is a schematic diagram of example IBS sets corresponding to various coding types in cases of different scenarios, information types, and/or service types;

DESCRIPTION OF EMBODIMENTS

The following describes the embodiments of the present invention in detail with reference to accompanying drawings.

Figure 3:
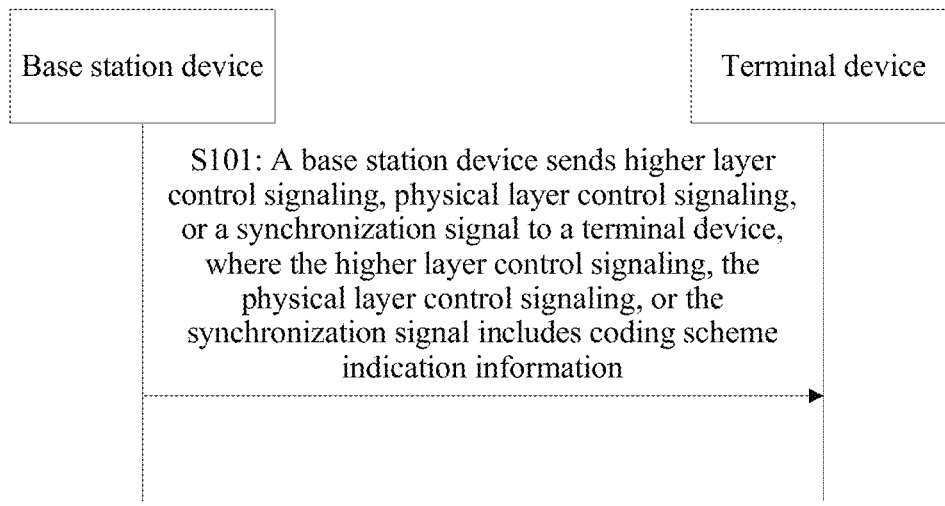
FIG. 3 is a schematic interaction diagram of a coding scheme determining method according to a first embodiment of the present invention.

FIG. 3 is a schematic interaction diagram of a coding scheme determining method according to a first embodiment of the present invention. The method includes the following step.

S101: A base station device sends higher layer control signaling information, physical layer control signaling information, or a synchronization signal to a terminal device, where the higher layer control signaling information, the physical layer control signaling information, or the synchronization signal includes coding scheme indication information, and the coding scheme indication information is used to indicate a coding scheme of an information block of bits.

In this embodiment, the coding scheme includes at least one of the following coding types: polar codes, turbo codes, LDPC codes, convolutional codes, block codes, and repetition codes. The information block of bits includes at least one of the following information types: control information and data information. To be specific, the indicated coding scheme is used to code the control information or the data information. The control information may further include system information, Channel Quality Information (Channel Quality Information/Indication, CQI), and the like.

The base station device sends, to the terminal device, the higher layer control signaling information, the physical layer control signaling information, or the synchronization signal, which is some signaling or signals usually sent during communication between the base station device and the terminal device. In this embodiment, the higher layer control signaling information, the physical layer control signaling information, or the synchronization signal carries the coding scheme indication information, where the coding scheme indication information is used to indicate the coding scheme of the information block of bits, to clearly indicate a coding scheme that should be used by the terminal device.

Figure 4:
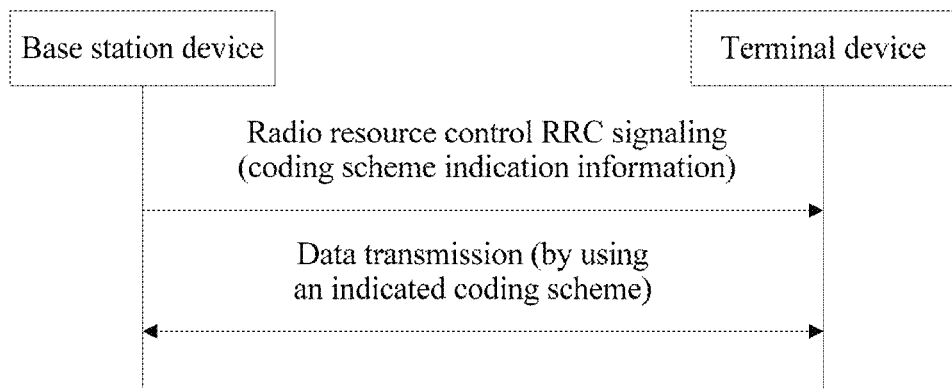
FIG. 4 is a schematic interaction diagram of example coding scheme determining performed by using radio resource control signaling.

In some embodiments, the higher layer control signaling may be radio resource control (Radio Resource Control, RRC) signaling. As shown in a schematic interaction diagram of example coding scheme determining performed by using radio resource control signaling in FIG. 4, the RRC signaling carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

Figure 5:
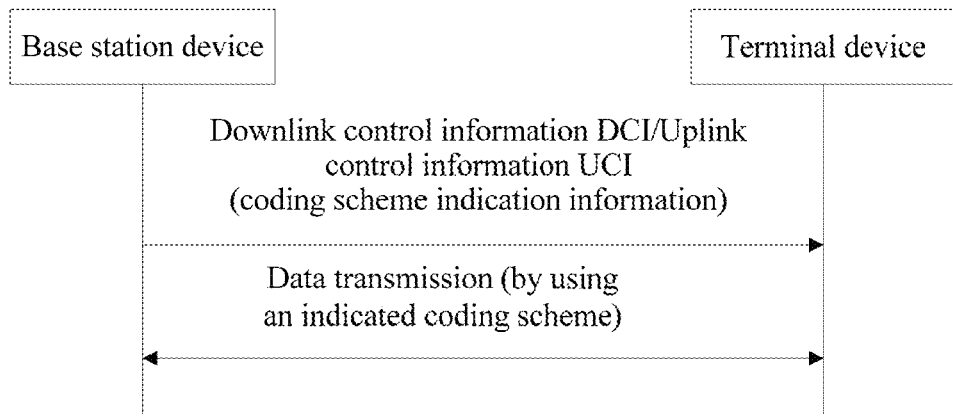
FIG. 5 is a schematic interaction diagram of example coding scheme determining performed by using downlink control information/uplink control information.

In some embodiments, the physical layer control signaling includes downlink control information (Downlink Control Information, DCI) and uplink control information (Uplink Control Information, UCI). As shown in a schematic interaction diagram of example coding scheme determining performed by using downlink control information/uplink control information in FIG. 5, the DCI/UCI carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

Figure 6:
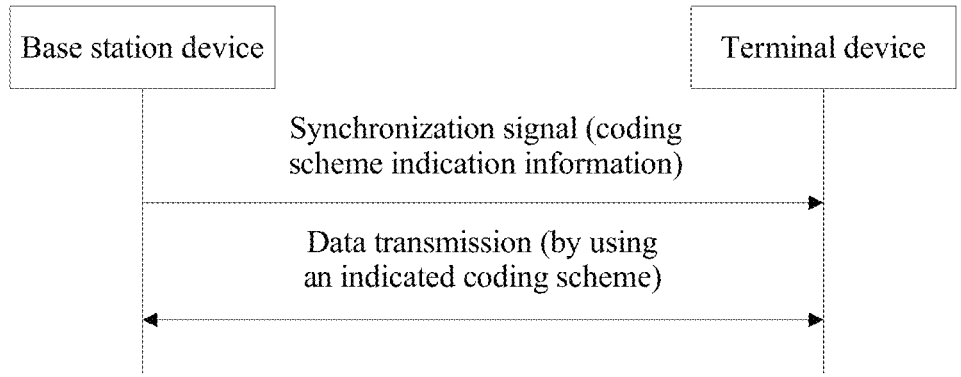
FIG. 6 is a schematic interaction diagram of example coding scheme determining performed by using a synchronization signal.

FIG. 6 is a schematic interaction diagram of example coding scheme determining performed by using a synchronization signal. The synchronization signal may be a primary synchronization signal (Primary Synchronization Signal, PSS), a secondary synchronization signal (Secondary Synchronization Signal, SSS), or the like. The synchronization signal carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

According to the coding scheme determining method provided in this embodiment of the present invention, the base station device sends, to the terminal device, the higher layer control signaling, the physical layer control signaling, or the synchronization signal that carries the coding scheme indication information, to indicate the coding scheme of the information block of bits. The terminal device and/or the base station device code/codes the information block of bits based on the indicated coding scheme, so that the base station device can clearly and flexibly indicate the coding scheme, thereby reducing signaling overheads caused by separately indicating the coding scheme.

Figure 7:
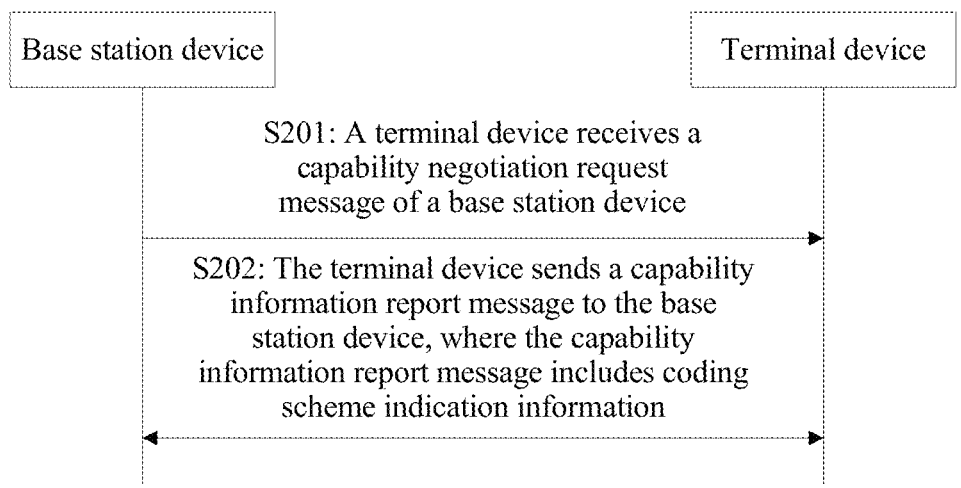
FIG. 7 is a schematic interaction diagram of a coding scheme determining method according to a second embodiment of the present invention.

FIG. 7 is a schematic interaction diagram of a coding scheme determining method according to a second embodiment of the present invention. The method includes the following steps.

S201: A terminal device receives a capability negotiation request message of a base station device.

S202: The terminal device sends a capability information report message to the base station device, where the capability information report message includes coding scheme indication information, and the coding scheme indication information is used to indicate a coding scheme of an information block of bits.

In this embodiment, the coding scheme includes at least one of the following coding types: polar codes, turbo codes, LDPC codes, convolutional codes, block codes, and repetition codes. The information block of bits includes at least one of the following information types: control information and data information. The control information may further include system information, Channel Quality Information CQI, and the like.

When the terminal device accesses the base station device, the base station device learns a capability of the terminal device, which is one of necessary processes. Specifically, the terminal device receives the capability negotiation request (UE Capability Enquiry) message of the base station device, and the terminal device sends the capability information (UE Capability Information) report message to the base station device. In this embodiment, the capability information report message includes the coding scheme indication information, where the coding scheme indication information is used to indicate the coding scheme, so that a coding scheme that should be used by the base station device can be clearly indicated, and no separate signaling needs to be used to indicate the coding scheme, thereby reducing signaling overheads.

According to the coding scheme determining method provided in this embodiment of the present invention, the terminal device returns, to the base station device, the capability information report message that carries the coding scheme indication information, to indicate the coding scheme. The base station device and/or the terminal device code/codes the information block of bits based on the indicated coding scheme, so that the terminal device can clearly and flexibly indicate the coding scheme, thereby reducing signaling overheads caused by separately indicating the coding scheme.

Figure 8:
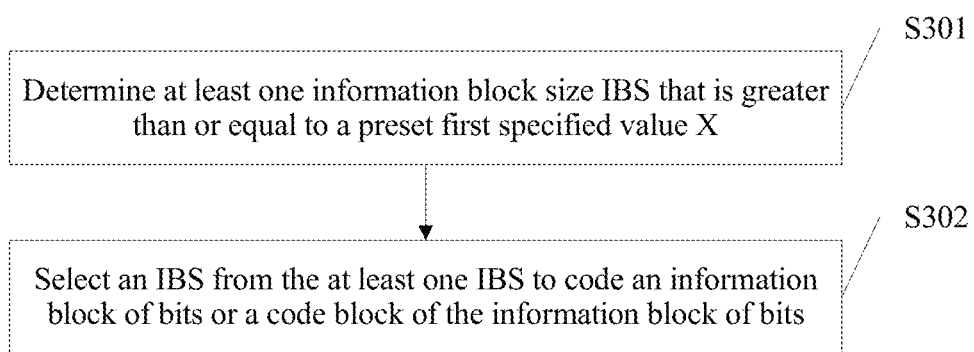
FIG. 8 is a schematic flowchart of a coding scheme determining method according to a third embodiment of the present invention.

FIG. 8 is a schematic flowchart of a coding scheme determining method according to a third embodiment of the present invention. The method includes the following steps.

S301: Determine at least one IBS that is greater than or equal to a preset first specified value X, where X is set based on a corresponding scenario, information type, and/or service type, and each scenario, information type, and/or service type is corresponding to at least one IBS.

As shown in a schematic diagram of an example LDPC coding scheme in FIG. 1, 12 IBSs are provided. In addition, 188 IBSs are provided for turbo codes, and a plurality of IBSs are included for others such as polar codes, convolutional codes, block codes, and repetition codes. In this embodiment, a suitable coding scheme needs to be determined based on a scenario, information type, and/or service type. Each coding scheme is corresponding to one IBS. Certainly, optionally, one IBS may also be corresponding to a plurality of coding schemes. To determine one IBS in such a large quantity of IBSs, a lower threshold for IBS selection, that is, the first specified value X, is first set. X is set based on a corresponding scenario, information type, and/or service type. This is the first step for determining a suitable coding scheme based on a scenario, information type, and/or service type. That is, one or more IBSs that are greater than or equal to X are determined. The determined one or more IBSs are preliminarily corresponding to a scenario, information type, and/or service type. In other words, each scenario, information type, and/or service type is corresponding to one or more IBSs.

S302: Select an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS.

In this embodiment, the coding scheme is determined by a scenario, information type, and/or service type, and the coding scheme includes at least one of the following coding types: polar codes, turbo codes, LDPC codes, convolutional codes, block codes, and repetition codes.

In the second step for determining a suitable coding scheme based on a scenario, information type, and/or service type, an IBS is selected from the determined one or more IBSs. Selecting an IBS from the one or more IBSs needs to meet both of the following two conditions: (1) the selected IBS is greater than or equal to the size of the information block of bits; and (2) the IBS is most approximate to the size of the information block of bits, that is, the IBS has a smallest difference from the size of the information block of bits; or (1)' the selected IBS is greater than or equal to a code block size of the code block; and (2)' the IBS is most approximate to the CBS, that is, the IBS has a smallest difference from the CBS. Herein, the code block is obtained after segmenting the information block of bits. If the size of the information block of bits is relatively large, the information block of bits generally needs to be segmented. An information block size is a size, of an information block, that is used for coding the information block of bits or the code block.

The IBS obtained according to S301 and S302 is determined and selected based on a scenario, information type, and/or service type. In addition, the IBS is most approximate to the size of the information block of bits or the code block size of the code block of the information block of bits, and therefore, is a suitable IBS. This information block size is used for coding, and therefore, a coding scheme thereof is also corresponding to the scenario, information type, and/or service type. Herein, the scenario is a service application scenario, for example, eMBB, mMTC, or URLLC; the information type includes control information and data information; the service type includes Voice, 3D video, Self driving car, and the like.

In some embodiments, each coding type may be corresponding to one IBS set, each IBS set includes at least one IBS, and each IBS is corresponding to one coding scheme. As shown in a schematic diagram of example IBS sets corresponding to various coding types in a case of a scenario, information type, and/or service type in (a) of FIG. 9, it is assumed that an IBS set for convolutional codes is {20, 30, 31, . . . }, an IBS set for turbo codes is {40, 48, 64, . . . }, an IBS set for polar codes is {128, 256, . . . }, and an IBS set for LDPC codes is {324, 432, . . . 1620 . . . }. A coding scheme is determined by using this embodiment. For example, it is assumed that a current scenario is eMBB, a service type is 3D video, an amount of to-be-transmitted data is relatively large, and a CBS is equal to 323. Therefore, X is set to 40, sets with the IBS greater than or equal to 40 include the IBS sets corresponding to the turbo codes, the polar codes, and the LDPC codes. Because the CBS is equal to 323, an IBS that needs to be selected is greater than or equal to 323 and the IBS is most approximate to the CBS. Therefore, an IBS equal to 324 is finally selected and a coding type is LDPC. In a manner of classifying IBSs into sets by coding type, determining an IBS and a coding scheme is more convenient. Further, as shown in a schematic diagram of example IBS sets corresponding to various coding types in cases of different scenarios, information types, and/or service types in FIG. 9, for a same scenario, information type, and/or service type, each coding type is corresponding to one IBS set, and the IBS set corresponding to each coding type does not have overlapped IBSs. However, for different scenarios, information types, and/or service types, IBS sets corresponding to coding types may have overlapped IBSs. As shown in FIG. 9, FIG. (a) is a schematic diagram of IBS sets corresponding to various coding types in a case of a scenario, information type, and/or service type, and FIG. (b) is a schematic diagram of IBS sets corresponding to various coding types in a case of another scenario, information type, and/or service type. In FIG. (a) and FIG. (b), IBS sets for LDPC codes have a same IBS equal to 1620, IBS sets for polar codes have a same IBS equal to 256, and the like. In addition, an IBS set for LDPC codes in FIG. (a) and an IBS set for polar codes in FIG. (b) have a same IBS equal to 432, and the like. The foregoing describes IBS sets corresponding to various coding types in this embodiment of the present invention by using examples. However, this embodiment is not limited to the foregoing specific examples.

Figure 10:
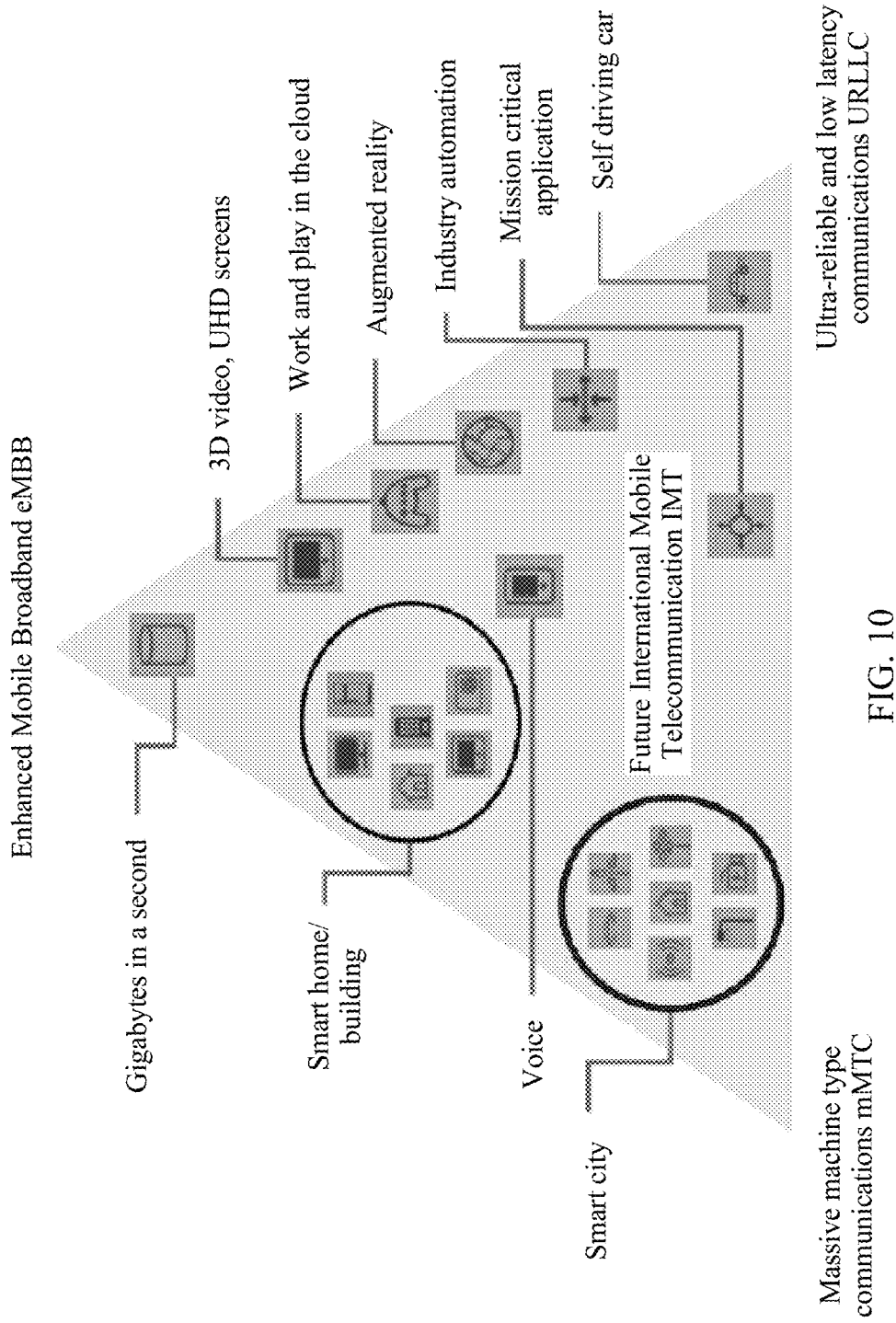
FIG. 10 is a schematic diagram of example foreseen use solutions of future International Mobile Telecommunications.

FIG. 10 is a schematic diagram of example foreseen use solutions of future International Mobile Telecommunications (International Mobile Telecommunication, IMT). This figure includes three typical application scenarios: eMBB, mMTC, and URLLC, and a plurality of use solutions, such as Smart city (Smart city), Voice (Voice), Smart home/building (Smart home/building), Gigabytes in a second (Gigabytes in a second), 3D video, UHD screens (3D video, UHD screens), Work and play in the cloud (Work and play in the cloud), Augmented reality (Augmented reality), Industry automation (Industry automation), Mission critical application (Mission critical application), and Self driving car (Self driving car). It may be seen from the figure that, some use solutions are applicable to a plurality of scenarios, for example, use solutions in the middle such as Voice, Smart home/building, 3D video, UHD screens, Work and play in the cloud, and Augmented reality are applicable to these three scenarios, but some use solutions are more applicable to a specific scenario, for example, the use solution of Gigabytes in a second is more applicable to the eMBB scenario, the use solution of Smart city is more applicable to the mMTC scenario, and the use solutions of Mission critical application and Self driving car are more applicable to the URLLC scenario. Different use solutions mean that different services are corresponding to different performance requirements or a same service in different scenarios is corresponding to different performance requirements, and selected channel coding schemes are different. The coding scheme determining method provided in this embodiment of the present invention may be applied to determine a suitable channel coding scheme, to achieve optimal performance.

According to the coding scheme determining method provided in this embodiment of the present invention, at least one IBS that is greater than or equal to the preset first specified value X is determined, and an IBS is selected from the at least one IBS to code the information block of bits or the code block of the information block of bits. X and the coding scheme are determined by a scenario, information type, and/or service type. In this way, a suitable coding scheme can be determined based on a scenario, information type, and/or service type.

Figure 11:
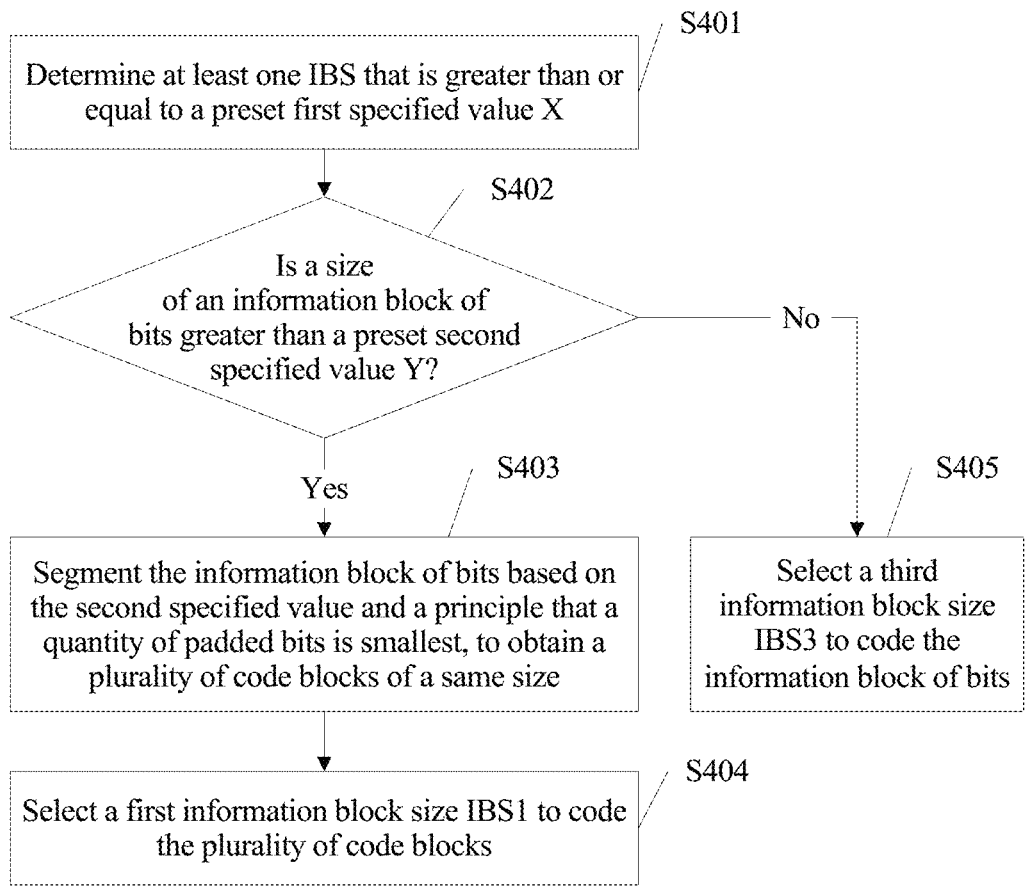
FIG. 11 is a schematic flowchart of a coding scheme determining method according to a fourth embodiment of the present invention.

FIG. 11 is a schematic flowchart of a coding scheme determining method according to a fourth embodiment of the present invention. The method includes the following steps.

S401: Determine at least one IBS that is greater than or equal to a preset first specified value X.

This step is the same as step S301 in the foregoing embodiment, and details are not described herein again.

S402: Determine whether a size of an information block of bits is greater than a preset second specified value Y; and if the size of the information block of bits is greater than the preset second specified value Y, proceed to step S403, or if the size of the information block of bits is not greater than the preset second specified value Y, proceed to step S405.

This step is used to determine whether to segment the information block of bits. Herein, Y is a reference value for segmentation, and is set based on a corresponding scenario, information type, and/or service type. For example, if the service type is 3D video, and an amount of data information is relatively large, to be specific, the size of the information block of bits is relatively large, segmentation generally needs to be performed and setting Y to an excessively small value is inappropriate.

S403: Segment the information block of bits based on the second specified value and a principle that a quantity of padded bits is smallest, to obtain a plurality of code blocks of a same size.

In this embodiment, the information block of bits is segmented, and code blocks of a same size are obtained. For example, if the size of the information block of bits is 3200 bits and Y is equal to 1600 bits, two code blocks of a same size are obtained through segmentation and the size of each code block is 1600 bits. When same code blocks are obtained through segmentation, the principle that a quantity of padded bits is smallest means selecting an IBS that is most approximate to a CBS, so that the quantity of padded bits is smallest.

S404: Select a first information block size IBS1 to code the plurality of code blocks.

For the code blocks obtained through segmentation, the IBS1 is selected to code the plurality of code blocks. The IBS1 is a sum of a code block size CBS of the code block and the quantity of padded bits, and the quantity of padded bits is an integer greater than or equal to 0. Therefore, the IBS1 is greater than or equal to the CBS. When the quantity of padded bits is smallest, the IBS1 is most approximate to the CBS. In the foregoing example, the size of each code block is 1600 bits, the IBS1 equal to 1620 bits may be selected, and 20 bits need to be padded to each code block.

The information block of bits is segmented into the plurality of code blocks of a same size, to use an information block size to code the plurality of code blocks obtained through segmentation. A segmentation manner is simple and the quantity of padded bits is smallest, thereby reducing bit padding overheads.

S405: Select a third information block size IBS3 to code the information block of bits.

If the information block of bits does not need to be segmented, the IBS3 is used to code the information block of bits. Similarly, the IBS3 is greater than or equal to the size of the information block of bits, and the IBS3 is most approximate to the size of the information block of bits.

According to the coding scheme determining method provided in this embodiment of the present invention, at least one IBS that is greater than or equal to the preset first specified value X is determined. The information block of bits that needs to be segmented is segmented into the plurality of code blocks of a same size. An IBS is selected from the at least one IBS to code the code block of the information block of bits. The IBS is the sum of the code block size of the code block and the quantity of padded bits. X and the coding scheme are determined by a scenario, information type, and/or service type. In this way, a suitable coding scheme can be determined based on a scenario, information type, and/or service type. In addition, the information block of bits is segmented into the plurality of code blocks of a same size, and an information block size is used to code the plurality of code blocks obtained through segmentation. A segmentation manner is simple and the quantity of padded bits is smallest, thereby reducing bit padding overheads.

Figure 13:
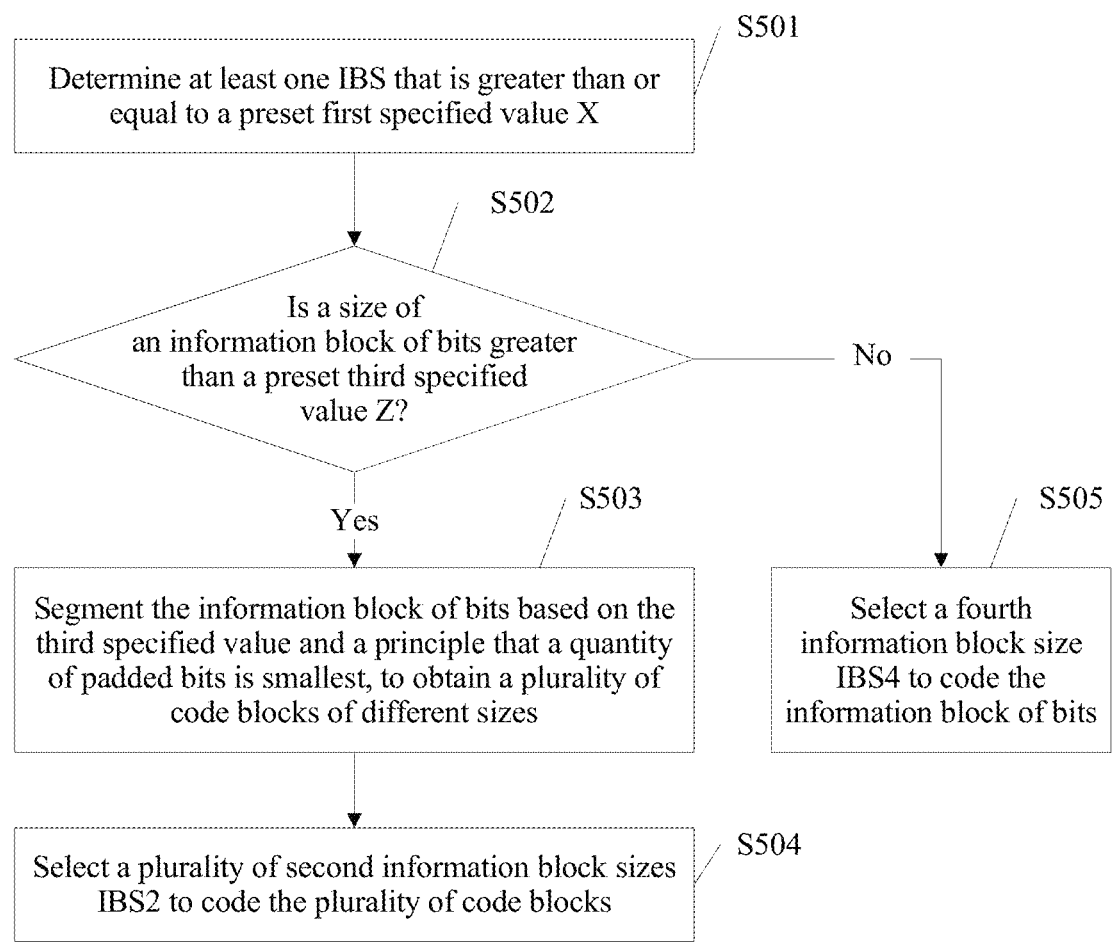
FIG. 13 is a schematic flowchart of a coding scheme determining method according to a fifth embodiment of the present invention.

FIG. 13 is a schematic flowchart of a coding scheme determining method according to a fifth embodiment of the present invention. The method includes the following steps.

S501: Determine at least one IBS that is greater than or equal to a preset first specified value X.

This step is the same as step S301 or S401 in the foregoing embodiment, and details are not described herein again.

S502: Determine whether a size of an information block of bits is greater than a preset third specified value Z; and if the size of the information block of bits is greater than the preset third specified value Z, proceed to step S503, or if the size of the information block of bits is not greater than the preset third specified value Z, proceed to step S505.

This step is used to determine whether to segment the information block of bits. Herein, Z is a reference value for segmentation, and is set based on a corresponding scenario, information type, and/or service type. For example, if the service type is 3D video, and an amount of data information is relatively large, to be specific, the size of the information block of bits is relatively large, segmentation generally needs to be performed and setting Z to an excessively small value is inappropriate.

S503: Segment the information block of bits based on the third specified value and a principle that a quantity of padded bits is smallest, to obtain a plurality of code blocks of different sizes.

The information block of bits often cannot be exactly segmented into a plurality of code blocks of a same size; or in consideration of diversifying coding schemes, the information block of bits is segmented in this step to obtain a plurality of code blocks of different sizes. For example, if the information type of the information block of bits is data information and the size of the transport block is 15000 bits, according to the principle that a quantity of padded bits is smallest, the transport block is segmented into a code block with a size of 10080 bits and 4920 remaining bits.

S504: Select a plurality of second information block sizes IBS2 to code the plurality of code blocks.

One IBS2 is selected to code each code block. Each IBS2 is a sum of a code block size CBS of each code block and the quantity of padded bits, and the quantity of padded bits is greater than or equal to 0. In the foregoing example, for the code block of 10080 bits, because there is one IBS2 equal to 10080 bits, the quantity of padded bits is 0, and the IBS2 of 10080 bits is selected to code the code block. For the code block of 4920 bits, an IBS equal to 5040 bits is most approximate to the code block, 60 bits are padded, and the IBS2 of 5040 bits is used to code the code block.

Figure 12:
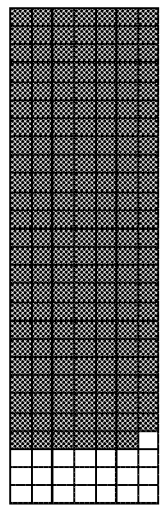
FIG. 12 is a schematic diagram of a principle that a quantity of padded bits is smallest on an example resource block.

One of manners of the principle that a quantity of padded bits is smallest may be as follows: Code blocks are sequentially obtained through segmentation. The first code block obtained through segmentation has a smallest quantity of padded bits, and then the second. In some embodiments, a code block with a code block size equal to a largest information block size is first obtained through segmentation. Then, code blocks are sequentially obtained through segmentation, and the quantity of padded bits needs to be smallest. For example, a transport block has a size of 15000 bits and is segmented into a code block with a size of 10080 bits and 4920 remaining bits. A size of 5040 bits is selected and 60 bits are padded, so that the code block with the size of 10080 bits and a code block with the size of 5040 bits are used for coding. Another manner is as follows: As shown in a schematic diagram of a principle that a quantity of padded bits is smallest on an example resource block in FIG. 12, a relatively large code block size is first determined, so that as many available transmission bits as possible on all subcarriers and OFDM symbols of the RB are used. When there is still an available transmission bit remained, one code block size that is less than or equal to the previous size is further determined, so that as many remaining available transmission bits as possible on all the subcarriers and OFDM symbols on the RB are used, and by analogy.

In some embodiments, a code block CB with a relatively small code block size CBS is mapped to a bit with high (low) reliability at a modulation constellation point. For example, in the 16QAM modulation scheme, one constellation point is corresponding to one 16QAM modulation symbol containing 4 bits, and the 4 bits have different transmission reliability. Therefore, in this embodiment of the present invention, a bit with relatively high reliability may be used to transmit a code block CB with a relatively small code block size CBS. In addition, in this embodiment of the present invention, a bit with relatively low reliability may alternatively be used to transmit a code block CB with a relatively small code block size CBS.

S505: Select a fourth information block size IBS4 to code the information block of bits.

If the information block of bits does not need to be segmented, the IBS4 is used to code the information block of bits. Similarly, the IBS4 is greater than or equal to the size of the information block of bits, and the IBS4 is most approximate to the size of the information block of bits.

According to the coding scheme determining method provided in this embodiment of the present invention, at least one IBS that is greater than or equal to the preset first specified value X is determined. The information block of bits is segmented to obtain the plurality of code blocks of different sizes. One IBS is selected from the at least one IBS to code each code block. The selected IBS is the sum of the code block and the quantity of padded bits. X and the coding scheme are determined by a scenario, information type, and/or service type. In this way, a suitable coding scheme can be determined based on a scenario, information type, and/or service type. In addition, the information block of bits is segmented into the plurality of code blocks of different sizes, and a plurality of information block sizes are used to code the plurality of code blocks. In this way, coding schemes are diversified, coding can be flexibly performed, and the quantity of padded bits is smallest, thereby reducing bit padding overheads.

Figure 14:
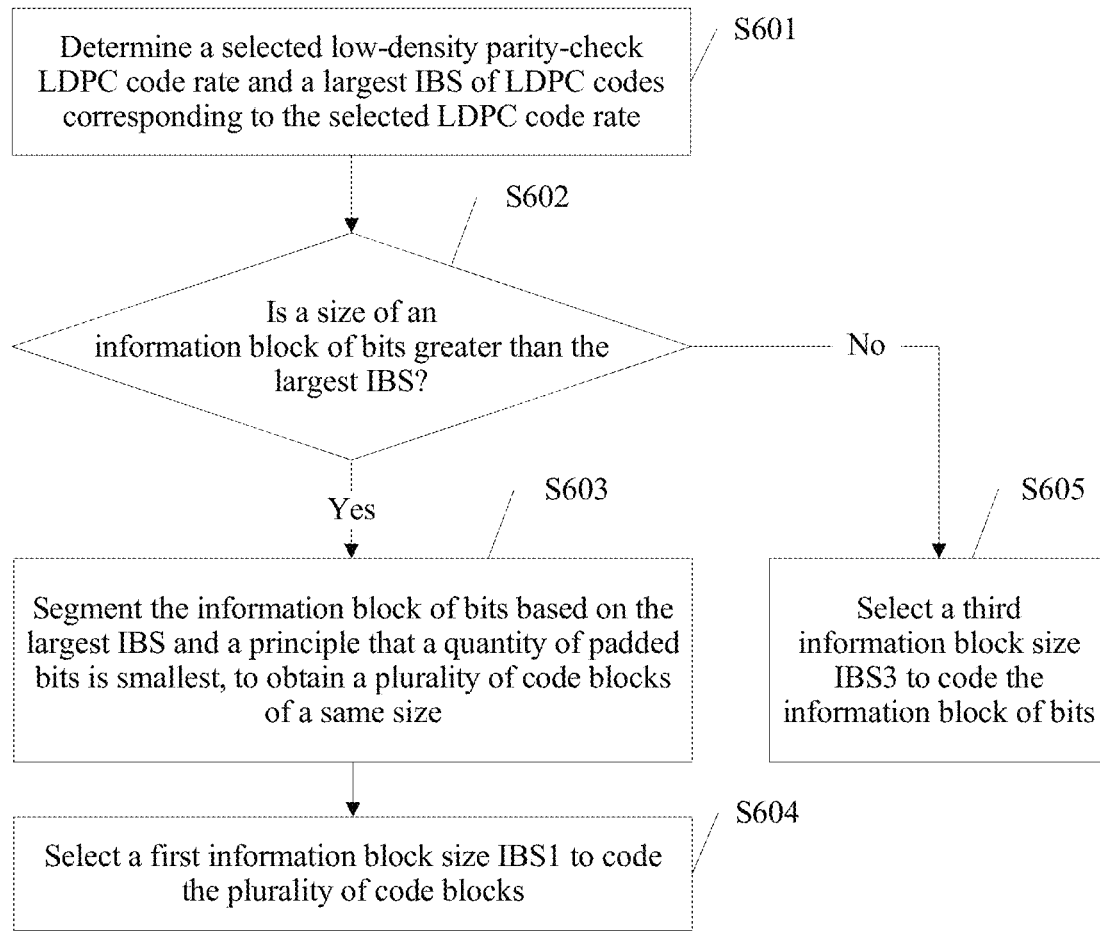
FIG. 14 is a schematic flowchart of a coding scheme determining method according to a sixth embodiment of the present invention.

FIG. 14 is a schematic flowchart of a coding scheme determining method according to a sixth embodiment of the present invention. The method includes the following steps.

S601: Determine a selected low-density parity-check LDPC code rate and a largest IBS of LDPC codes corresponding to the selected LDPC code rate.

In this embodiment, the coding type of LDPC codes is selected by default. Therefore, at least one IBS that is greater than or equal to X is determined. For example, a smallest IBS of LDPC codes is 324, and therefore, X may be set to 324.

As shown in a schematic diagram of an example LDPC coding scheme in FIG. 1, LDPC codes have four code rates (1/2, 2/3, 3/4, and 5/6), and 12 IBSs are provided, namely, 12 coding schemes are provided. To select an IBS, an LDPC code rate needs to be determined first. After the code rate is selected, a largest IBS of LDPC codes corresponding to the code rate can be determined. As shown in FIG. 1, a largest IBS corresponding to the code rate 1/2 is equal to 972 bits, a largest IBS corresponding to the code rate 2/3 is equal to 1296 bits, a largest IBS corresponding to the code rate 3/4 is equal to 1458 bits, and a largest IBS corresponding to the code rate 5/6 is equal to 1620 bits.

Two IBSs are the same for LDPC codes, that is, the largest IBS equal to 972 bits corresponding to the code rate 1/2 and a medium IBS equal to 972 bits corresponding to the code rate 3/4. By selecting a code rate, a largest IBS corresponding to the code rate can be determined, and a coding scheme can be determined.

S602: Determine whether a size of an information block of bits is greater than the largest IBS; and if the size of the information block of bits is greater than the largest IBS, proceed to step S603, or if the size of the information block of bits is not greater than the largest IBS, proceed to step S605.

This step is used to determine whether to perform segmentation. Herein, a reference value for segmentation is the largest IBS.

S603: Segment the information block of bits based on the largest IBS and a principle that a quantity of padded bits is smallest, to obtain a plurality of code blocks of a same size.

In this embodiment, the information block of bits is segmented into code blocks of a same size, a process thereof is the same as step S403 in the foregoing embodiment, and details are not described herein again. Certainly, the information block of bits may alternatively be segmented into code blocks of different sizes, and a process thereof is the same as step S503 is the foregoing embodiment.

S604: Select a first information block size IBS1 to code the plurality of code blocks.

When the code blocks of a same size are obtained through segmentation, because the largest IBS is used as the reference value for segmentation, the IBS1 is generally the largest IBS.

Certainly, the reference value for segmentation may alternatively be set to the smallest IBS corresponding to the code rate.

S605: Select a third information block size IBS3 to code the information block of bits.

If the information block of bits does not need to be segmented, the IBS3 is used to code the information block of bits. Similarly, the IBS3 is greater than or equal to the size of the information block of bits, and the IBS3 is most approximate to the size of the information block of bits.

According to the coding scheme determining method provided in this embodiment of the present invention, an IBS is selected from at least one IBS of LDPC codes, to code the information block of bits or the code block of the information block of bits. X and the coding scheme are determined by a scenario, information type, and/or service type. In this way, a suitable LDPC coding scheme can be determined based on a scenario, information type, and/or service type.

Figure 15:
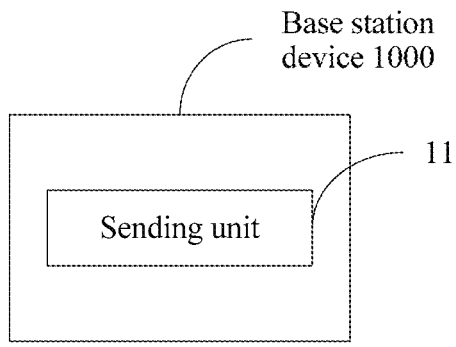
FIG. 15 is a schematic structural diagram of a base station device according to a seventh embodiment of the present invention.

FIG. 15 is a schematic structural diagram of a base station device according to a seventh embodiment of the present invention. The base station device 1000 includes a sending unit 11.

The sending unit 11 is configured to send higher layer control signaling, physical layer control signaling, or a synchronization signal to a terminal device, where the higher layer control signaling, the physical layer control signaling, or the synchronization signal includes coding scheme indication information, and the coding scheme indication information is used to indicate a coding scheme of an information block of bits.

In this embodiment, the coding scheme includes at least one of the following coding types: polar codes, turbo codes, LDPC codes, convolutional codes, block codes, and repetition codes. The information block of bits includes at least one of the following information types: control information and data information. To be specific, the indicated coding scheme is used to code the control information or the data information. The control information may further include system information, Channel Quality Information, and the like.

The base station device sends, to the terminal device, the higher layer control signaling, the physical layer control signaling, or the synchronization signal, which is some signaling or signals usually sent during communication between the base station device and the terminal device. In this embodiment, the higher layer control signaling, the physical layer control signaling, or the synchronization signal carries the coding scheme indication information, where the coding scheme indication information is used to indicate the coding scheme of the information block of bits, to clearly indicate a coding scheme that should be used by the terminal device.

In some embodiments, the higher layer control signaling may be radio resource control signaling. As shown in a schematic interaction diagram of example coding scheme determining performed by using radio resource control signaling in FIG. 4, the RRC signaling carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

In some embodiments, the physical layer control signaling includes downlink control information and uplink control information. As shown in a schematic interaction diagram of example coding scheme determining performed by using downlink control information/uplink control information in FIG. 5, the DCI/UCI carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

FIG. 6 is a schematic interaction diagram of example coding scheme determining performed by using a synchronization signal. The synchronization signal may be a primary synchronization signal, a secondary synchronization signal, or the like. The synchronization signal carries the coding scheme indication information, where the coding scheme indication information is used to indicate the coding scheme. When the information block of bits is transmitted between the terminal device and the base station device, the terminal device and/or the base station device use/uses the indicated coding scheme to code the information block of bits.

According to the base station device provided in this embodiment of the present invention, the base station device sends, to the terminal device, the higher layer control signaling, the physical layer control signaling, or the synchronization signal that carries the coding scheme indication information, to indicate the coding scheme of the information block of bits. The terminal device and/or the base station device code/codes the information block of bits based on the indicated coding scheme, so that the base station device can clearly and flexibly indicate the coding scheme, thereby reducing signaling overheads caused by separately indicating the coding scheme.

Figure 16:
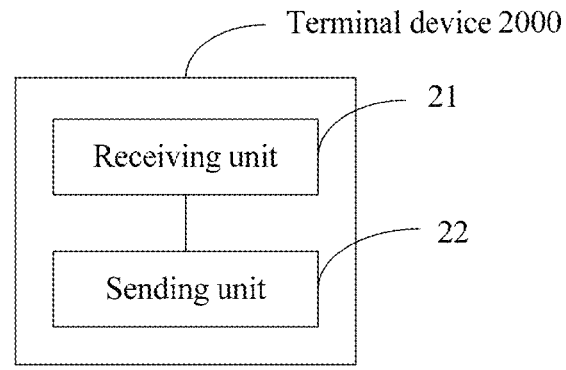
FIG. 16 is a schematic structural diagram of a terminal device according to an eighth embodiment of the present invention.

FIG. 16 is a schematic structural diagram of a terminal device according to an eighth embodiment of the present invention. The terminal device 2000 includes a receiving unit 21 and a sending unit 22.

The receiving unit 21 is configured to receive a capability negotiation request message of a base station device.

The sending unit 22 is configured to send a capability information report message to the base station device, where the capability information report message includes coding scheme indication information, and the coding scheme indication information is used to indicate a coding scheme of an information block of bits.

In this embodiment, the coding scheme includes at least one of the following coding types: polar codes, turbo codes, LDPC codes, convolutional codes, block codes, and repetition codes. The information block of bits includes at least one of the following information types: control information and data information. The control information may further include system information, Channel Quality Information CQI, and the like.

When the terminal device accesses the base station device, the base station device learns a capability of the terminal device, which is one of necessary processes. Specifically, the terminal device receives the capability negotiation request message of the base station device, and the terminal device sends the capability information report message to the base station device. In this embodiment, the capability information report message includes the coding scheme indication information, where the coding scheme indication information is used to indicate the coding scheme, so that a coding scheme that should be used by the base station device can be clearly indicated, and no separate signaling needs to be used to indicate the coding scheme, thereby reducing signaling overheads.

According to the terminal device provided in this embodiment of the present invention, the terminal device returns, to the base station device, the capability information report message that carries the coding scheme indication information, to indicate the coding scheme. The base station device and/or the terminal device code/codes the information block of bits based on the indicated coding scheme, so that the terminal device can clearly and flexibly indicate the coding scheme, thereby reducing signaling overheads caused by separately indicating the coding scheme.

Figure 17:
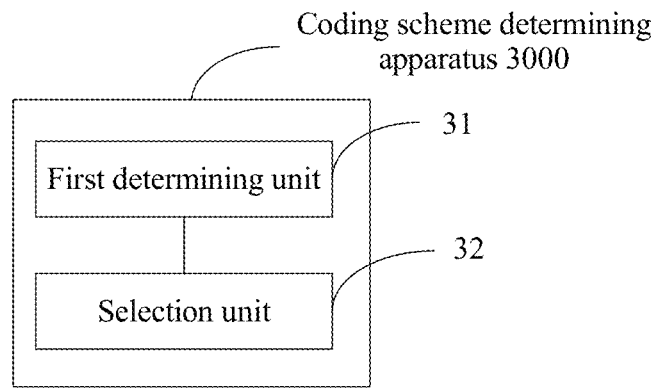
FIG. 17 is a schematic structural diagram of a coding scheme determining apparatus according to a ninth embodiment of the present invention.

FIG. 17 is a schematic structural diagram of a coding scheme determining apparatus according to a ninth embodiment of the present invention. The apparatus 3000 includes a first determining unit 31 and a selection unit 32.

The first determining unit 31 is configured to determine at least one IBS that is greater than or equal to a preset first specified value X, where X is set based on a corresponding scenario, information type, and/or service type, and each scenario, information type, and/or service type is corresponding to at least one IBS.

As shown in a schematic diagram of an example LDPC coding scheme in FIG. 1, 12 IBSs are provided. In addition, 188 IBSs are provided for turbo codes, and a plurality of IBSs are included for others such as polar codes, convolutional codes, block codes, and repetition codes. In this embodiment, a suitable coding scheme needs to be determined based on a scenario, information type, and/or service type. Each coding scheme is corresponding to one IBS. Certainly, optionally, one IBS may also be corresponding to a plurality of coding schemes. To determine one IBS in such a large quantity of IBSs, a lower threshold for IBS selection, that is, the first specified value X, is first set. X is set based on a corresponding scenario, information type, and/or service type. This is the first step for determining a suitable coding scheme based on a scenario, information type, and/or service type. That is, one or more IBSs that are greater than or equal to X are determined. The determined one or more IBSs are preliminarily corresponding to a scenario, information type, and/or service type. In other words, each scenario, information type, and/or service type is corresponding to one or more IBSs.

The selection unit 32 is configured to select an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS.

In this embodiment, the coding scheme is determined by a scenario, information type, and/or service type, and the coding scheme includes at least one of the following coding types: polar codes, turbo codes, LDPC codes, convolutional codes, block codes, and repetition codes.

In the second step for determining a suitable coding scheme based on a scenario, information type, and/or service type, an IBS is selected from the determined one or more IBSs. Selecting an IBS from the one or more IBSs needs to meet both of the following two conditions: (1) the selected IBS is greater than or equal to the size of the information block of bits; and (2) the IBS is most approximate to the size of the information block of bits, that is, the IBS has a smallest difference from the size of the information block of bits; or (1)' the selected IBS is greater than or equal to a code block size of the code block; and (2)' the IBS is most approximate to the CBS, that is, the IBS has a smallest difference from the CBS. Herein, the code block is obtained after segmenting the information block of bits. If the size of the information block of bits is relatively large, the information block of bits generally needs to be segmented. An information block size is a size, of an information block, that is used for coding the information block of bits or the code block.

The IBS obtained according to this embodiment is determined and selected based on a scenario, information type, and/or service type. In addition, the IBS is most approximate to the size of the information block of bits or the code block size of the code block of the information block of bits, and therefore, is a suitable IBS. This information block size is used for coding, and therefore, a coding scheme thereof is also corresponding to the scenario, information type, and/or service type. Herein, the scenario is a service application scenario, for example, eMBB, mMTC, or URLLC; the information type includes control information and data information; the service type includes Voice, 3D video, Self driving car, and the like.

In some embodiments, each coding type may be corresponding to one IBS set, each IBS set includes at least one IBS, and each IBS is corresponding to one coding scheme. As shown in a schematic diagram of example IBS sets corresponding to various coding types in a case of a scenario, information type, and/or service type in (a) of FIG. 9, it is assumed that an IBS set for convolutional codes is {20, 30, 31, . . . }, an IBS set for turbo codes is {40, 48, 64, . . . }, an IBS set for polar codes is {128, 256, . . . }, and an IBS set for LDPC codes is {324, 432, . . . 1620 . . . }. A coding scheme is determined by using this embodiment. For example, it is assumed that a current scenario is eMBB, a service type is 3D video, an amount of to-be-transmitted data is relatively large, and a CBS is equal to 323. Therefore, X is set to 40, sets with the IBS greater than or equal to 40 include the IBS sets corresponding to the turbo codes, the polar codes, and the LDPC codes. Because the CBS is equal to 323, an IBS that needs to be selected is greater than or equal to 323 and the IBS is most approximate to the CBS. Therefore, an IBS equal to 324 is finally selected and a coding type is LDPC. In a manner of classifying IBSs into sets by coding type, determining an IBS and a coding scheme is more convenient. Further, as shown in a schematic diagram of example IBS sets corresponding to various coding types in cases of different scenarios, information types, and/or service types in FIG. 9, for a same scenario, information type, and/or service type, each coding type is corresponding to one IBS set, and the IBS set corresponding to each coding type does not have overlapped IBSs. However, for different scenarios, information types, and/or service types, IBS sets corresponding to coding types may have overlapped IBSs. As shown in FIG. 9, FIG. (a) is a schematic diagram of IBS sets corresponding to various coding types in a case of a scenario, information type, and/or service type, and FIG. (b) is a schematic diagram of IBS sets corresponding to various coding types in a case of another scenario, information type, and/or service type. In FIG. (a) and FIG. (b), IBS sets for LDPC codes have a same IBS equal to 1620, IBS sets for polar codes have a same IBS equal to 256, and the like. In addition, an IBS set for LDPC codes in FIG. (a) and an IBS set for polar codes in FIG. (b) have a same IBS equal to 432, and the like. The foregoing describes IBS sets corresponding to various coding types in this embodiment of the present invention by using examples. However, this embodiment is not limited to the foregoing specific examples.

FIG. 10 is a schematic diagram of example foreseen use solutions of future International Mobile Telecommunications (International Mobile Telecommunication, IMT). This figure includes three typical application scenarios: eMBB, mMTC, and URLLC, and a plurality of use solutions, such as Smart city (Smart city), Voice (Voice), Smart home/building (Smart home/building), Gigabytes in a second (Gigabytes in a second), 3D video, UHD screens (3D video, UHD screens), Work and play in the cloud (Work and play in the cloud), Augmented reality (Augmented reality), Industry automation (Industry automation), Mission critical application (Mission critical application), and Self driving car (Self driving car). It may be seen from the figure that, some use solutions are applicable to a plurality of scenarios, for example, use solutions in the middle such as Voice, Smart home/building, 3D video, UHD screens, Work and play in the cloud, and Augmented reality are applicable to these three scenarios, but some use solutions are more applicable to a specific scenario, for example, the use solution of Gigabytes in a second is more applicable to the eMBB scenario, the use solution of Smart city is more applicable to the mMTC scenario, and the use solutions of Mission critical application and Self driving car are more applicable to the URLLC scenario. Different use solutions mean that different services are corresponding to different performance requirements or a same service in different scenarios is corresponding to different performance requirements, and selected channel coding schemes are different. The coding scheme determining method provided in this embodiment of the present invention may be applied to determine a suitable channel coding scheme, to achieve optimal performance.

According to the coding scheme determining apparatus provided in this embodiment of the present invention, at least one IBS that is greater than or equal to the preset first specified value X is determined, and an IBS is selected from the at least one IBS to code the information block of bits or the code block of the information block of bits. X and the coding scheme are determined by a scenario, information type, and/or service type. In this way, a suitable coding scheme can be determined based on a scenario, information type, and/or service type.

Figure 18:
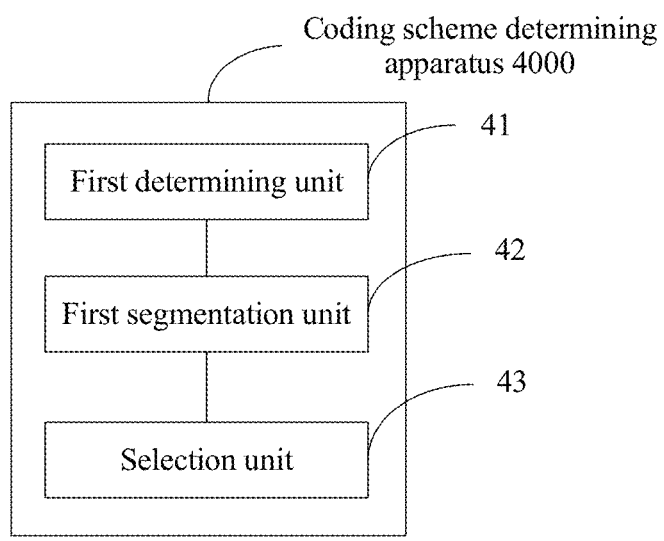
FIG. 18 is a schematic structural diagram of a coding scheme determining apparatus according to a tenth embodiment of the present invention.

FIG. 18 is a schematic structural diagram of a coding scheme determining apparatus according to a tenth embodiment of the present invention. The apparatus 4000 includes a first determining unit 41, a first segmentation unit 42, and a selection unit 43.

The first determining unit 41 is configured to determine at least one IBS that is greater than or equal to a preset first specified value X.

A function of the first determining unit 41 is the same as that of the first determining unit 31 in the foregoing embodiment, and details are not described herein again.

The first segmentation unit 42 is configured to: if the size of the information block of bits is greater than a preset second specified value Y, segment the information block of bits based on the second specified value and a principle that a quantity of padded bits is smallest, to obtain a plurality of code blocks of a same size, where Y is set based on a corresponding scenario, information type, and/or service type.

The first segmentation unit 42 first determines whether to segment the information block of bits. Herein, Y is a reference value for segmentation, and is set based on a corresponding scenario, information type, and/or service type. For example, if the service type is 3D video, and an amount of data information is relatively large, to be specific, the size of the information block of bits is relatively large, segmentation generally needs to be performed and setting Y to an excessively small value is inappropriate.

Then, the first segmentation unit 42 segments the information block of bits based on the second specified value and the principle that a quantity of padded bits is smallest, to obtain the plurality of code blocks of a same size. In this embodiment, the information block of bits is segmented, and code blocks of a same size are obtained. For example, if the size of the information block of bits is 3200 bits and Y is equal to 1600 bits, two code blocks of a same size are obtained through segmentation and the size of each code block is 1600 bits. When same code blocks are obtained through segmentation, the principle that a quantity of padded bits is smallest means selecting an IBS that is most approximate to a CBS, so that the quantity of padded bits is smallest.

The selection unit 43 is configured to select a first information block size IBS1 to code the plurality of code blocks.

For the code blocks obtained through segmentation, the IBS1 is selected to code the plurality of code blocks. The IBS1 is a sum of a code block size CBS of the code block and the quantity of padded bits, and the quantity of padded bits is an integer greater than or equal to 0. Therefore, the IBS1 is greater than or equal to the CBS. When the quantity of padded bits is smallest, the IBS1 is most approximate to the CBS. In the foregoing example, the size of each code block is 1600 bits, the IBS1 equal to 1620 bits may be selected, and 20 bits need to be padded to each code block.

The information block of bits is segmented into the plurality of code blocks of a same size, to use an information block size to code the plurality of code blocks obtained through segmentation. A segmentation manner is simple and the quantity of padded bits is smallest, thereby reducing bit padding overheads.

The selection unit 43 is further configured to, if the size of the information block of bits is less than or equal to the preset second specified value Y, select a third information block size IBS3 to code the information block of bits.

If the information block of bits does not need to be segmented, the IBS3 is used to code the information block of bits. Similarly, the IBS3 is greater than or equal to the size of the information block of bits, and the IBS3 is most approximate to the size of the information block of bits.

According to the coding scheme determining apparatus provided in this embodiment of the present invention, at least one IBS that is greater than or equal to the preset first specified value X is determined. The information block of bits that needs to be segmented is segmented into the plurality of code blocks of a same size. An IBS is selected from the at least one IBS to code the code block of the information block of bits. The IBS is the sum of the code block size of the code block and the quantity of padded bits. X and the coding scheme are determined by a scenario, information type, and/or service type. In this way, a suitable coding scheme can be determined based on a scenario, information type, and/or service type. In addition, the information block of bits is segmented into the plurality of code blocks of a same size, and an information block size is used to code the plurality of code blocks obtained through segmentation. A segmentation manner is simple and the quantity of padded bits is smallest, thereby reducing bit padding overheads.

Figure 19:
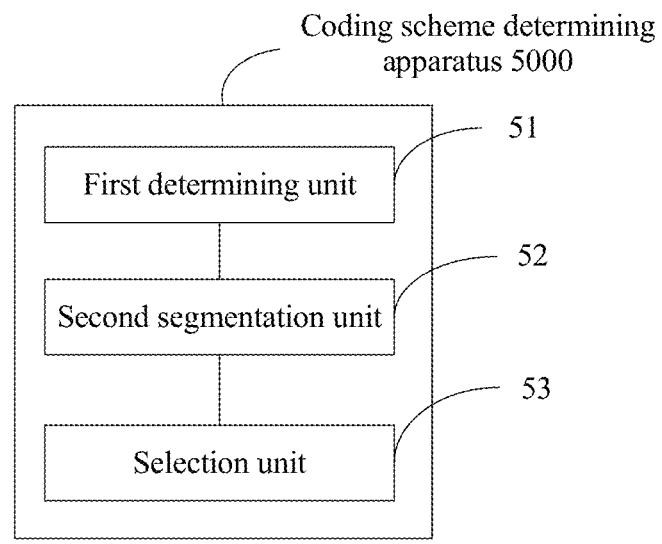
FIG. 19 is a schematic structural diagram of a coding scheme determining apparatus according to an eleventh embodiment of the present invention.

FIG. 19 is a schematic structural diagram of a coding scheme determining apparatus according to an eleventh embodiment of the present invention. The apparatus 5000 includes a first determining unit 51, a second segmentation unit 52, and a selection unit 53.

The first determining unit 51 is configured to determine at least one IBS that is greater than or equal to a preset first specified value X.

A function of the first determining unit 51 is the same as that of the first determining unit 31 or the first determining unit 41 in the foregoing embodiment, and details are not described herein again.

The second segmentation unit 52 is configured to: if the size of the information block of bits is greater than a preset third specified value Z, segment the information block of bits based on the third specified value and a principle that a quantity of padded bits is smallest, to obtain a plurality of code blocks of different sizes, where Z is set based on a corresponding scenario, information type, and/or service type.

The second segmentation unit 52 first determines whether to segment the information block of bits. Herein, Z is a reference value for segmentation, and is set based on a corresponding scenario, information type, and/or service type. For example, if the service type is 3D video, and an amount of data information is relatively large, to be specific, the size of the information block of bits is relatively large, segmentation generally needs to be performed and setting Z to an excessively small value is inappropriate.

Then, the second segmentation unit 52 segments the information block of bits based on the third specified value and the principle that a quantity of padded bits is smallest, to obtain the plurality of code blocks of different sizes.

The information block of bits often cannot be exactly segmented into a plurality of code blocks of a same size; or in consideration of diversifying coding schemes, the information block of bits is segmented in this embodiment to obtain a plurality of code blocks of different sizes. For example, if the information type of the information block of bits is data information and the size of the transport block is 15000 bits, according to the principle that a quantity of padded bits is smallest, the transport block is segmented into a code block with a size of 10080 bits and 4920 remaining bits.

The selection unit 53 is configured to select a plurality of second information block sizes IBS2 to code the plurality of code blocks.

One IBS2 is selected to code each code block. Each IBS2 is a sum of a code block size CBS of each code block and the quantity of padded bits, and the quantity of padded bits is greater than or equal to 0. In the foregoing example, for the code block of 10080 bits, because there is one IBS2 equal to 10080 bits, the quantity of padded bits is 0, and the IBS2 of 10080 bits is selected to code the code block. For the code block of 4920 bits, an IBS equal to 5040 bits is most approximate to the code block, 60 bits are padded, and the IBS2 of 5040 bits is used to code the code block.

One of manners of the principle that a quantity of padded bits is smallest may be as follows: Code blocks are sequentially obtained through segmentation. The first code block obtained through segmentation has a smallest quantity of padded bits, and then the second. In some embodiments, a code block with a code block size equal to a largest information block size is first obtained through segmentation. Then, code blocks are sequentially obtained through segmentation, and the quantity of padded bits needs to be smallest. For example, a transport block has a size of 15000 bits and is segmented into a code block with a size of 10080 bits and 4920 remaining bits. A size of 5040 bits is selected and 60 bits are padded, so that the code block with the size of 10080 bits and a code block with the size of 5040 bits are used for coding. Another manner is as follows: As shown in a schematic diagram of a principle that a quantity of padded bits is smallest on an example resource block in FIG. 12, a relatively large code block size is first determined, so that as many available transmission bits as possible on all subcarriers and OFDM symbols of the RB are used. When there is still an available transmission bit remained, one code block size that is less than or equal to the previous size is further determined, so that as many remaining available transmission bits as possible on all the subcarriers and OFDM symbols on the RB are used, and by analogy.

In some embodiments, a code block CB with a relatively small code block size CBS is mapped to a bit with high (low) reliability at a modulation constellation point. For example, in the 16QAM modulation scheme, one constellation point is corresponding to one 16QAM modulation symbol containing 4 bits, and the 4 bits have different transmission reliability. Therefore, in this embodiment of the present invention, a bit with relatively high reliability may be used to transmit a code block CB with a relatively small code block size CBS. In addition, in this embodiment of the present invention, a bit with relatively low reliability may alternatively be used to transmit a code block CB with a relatively small code block size CBS.

The selection unit 53 is further configured to, if the size of the information block of bits is greater than the preset third specified value Z, select a fourth information block size IBS4 to code the information block of bits.

If the information block of bits does not need to be segmented, the IBS4 is used to code the information block of bits. Similarly, the IBS4 is greater than or equal to the size of the information block of bits, and the IBS4 is most approximate to the size of the information block of bits.

According to the coding scheme determining apparatus provided in this embodiment of the present invention, at least one IBS that is greater than or equal to the preset first specified value X is determined. The information block of bits is segmented to obtain the plurality of code blocks of different sizes. One IBS is selected from the at least one IBS to code each code block. The selected IBS is the sum of the code block and the quantity of padded bits. X and the coding scheme are determined by a scenario, information type, and/or service type. In this way, a suitable coding scheme can be determined based on a scenario, information type, and/or service type. In addition, the information block of bits is segmented into the plurality of code blocks of different sizes, and a plurality of information block sizes are used to code the plurality of code blocks. In this way, coding schemes are diversified, coding can be flexibly performed, and the quantity of padded bits is smallest, thereby reducing bit padding overheads.

Figure 20:
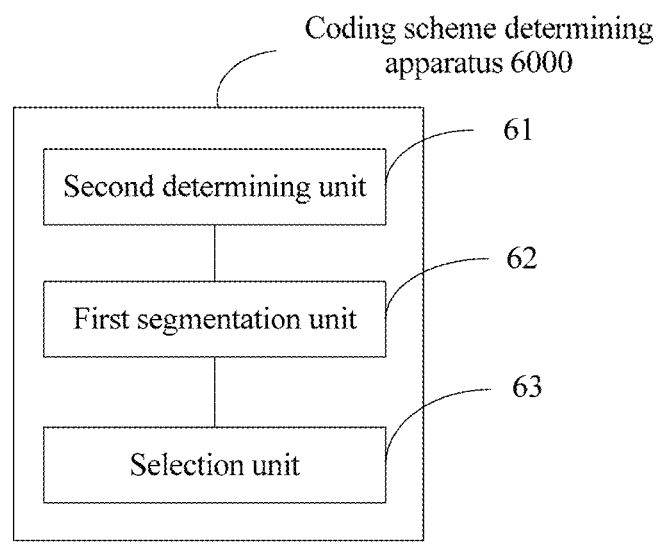
FIG. 20 is a schematic structural diagram of a coding scheme determining apparatus according to a twelfth embodiment of the present invention.

FIG. 20 is a schematic structural diagram of a coding scheme determining apparatus according to a twelfth embodiment of the present invention. The apparatus 6000 includes a second determining unit 61, a first segmentation unit 62, and a selection unit 63.

The second determining unit 61 is configured to determine a selected low-density parity-check LDPC code rate and a largest IBS of LDPC codes corresponding to the selected LDPC code rate.

In this embodiment, the coding type of LDPC codes is selected by default. Therefore, at least one IBS that is greater than or equal to X is determined. For example, a smallest IBS of LDPC codes is 324, and therefore, X may be set to 324.

As shown in a schematic diagram of an example LDPC coding scheme in FIG. 1, LDPC codes have four code rates (1/2, 2/3, 3/4, and 5/6), and 12 IBSs are provided, namely, 12 coding schemes are provided. To select an IBS, an LDPC code rate needs to be determined first. After the code rate is selected, a largest IBS of LDPC codes corresponding to the code rate can be determined. As shown in FIG. 1, a largest IBS corresponding to the code rate 1/2 is equal to 972 bits, a largest IBS corresponding to the code rate 2/3 is equal to 1296 bits, a largest IBS corresponding to the code rate 3/4 is equal to 1458 bits, and a largest IBS corresponding to the code rate 5/6 is equal to 1620 bits.

Two IBSs are the same for LDPC codes, that is, the largest IBS equal to 972 bits corresponding to the code rate 1/2 and a medium IBS equal to 972 bits corresponding to the code rate 3/4. By selecting a code rate, a largest IBS corresponding to the code rate can be determined, and a coding scheme can be determined.

The first segmentation unit 62 is configured to, if a size of the information block of bits is greater than the largest IBS, segment the information block of bits based on the largest IBS and a principle that a quantity of padded bits is smallest, to obtain a plurality of code blocks of a same size.

The first segmentation unit 62 first determines whether to perform segmentation. Herein, a reference value for segmentation is the largest IBS. Then, the first segmentation unit 62 segments the information block of bits based on the largest IBS and the principle that a quantity of padded bits is smallest, to obtain the plurality of code blocks of a same size.

A function of segmenting the information block of bits into the code blocks of a same size in this embodiment is the same as that of the first segmentation unit 42 in the foregoing embodiment, and details are not described herein again. Certainly, the information block of bits may alternatively be segmented into code blocks of different sizes.

The selection unit 63 is configured to select a first information block size IBS1 to code the plurality of code blocks.

When the code blocks of a same size are obtained through segmentation, because the largest IBS is used as the reference value for segmentation, the IBS1 is generally the largest IBS.

Certainly, the reference value for segmentation may alternatively be set to the smallest IBS corresponding to the code rate.

The selection unit 63 is further configured to, if the size of the information block of bits is less than or equal to the largest IBS, select a third information block size IBS3 to code the information block of bits.

If the information block of bits does not need to be segmented, the IBS3 is used to code the information block of bits. Similarly, the IBS3 is greater than or equal to the size of the information block of bits, and the IBS3 is most approximate to the size of the information block of bits.

According to the coding scheme determining apparatus provided in this embodiment of the present invention, an IBS is selected from at least one IBS of LDPC codes, to code the information block of bits or the code block of the information block of bits. X and the coding scheme are determined by a scenario, information type, and/or service type. In this way, a suitable LDPC coding scheme can be determined based on a scenario, information type, and/or service type.

Figure 21:
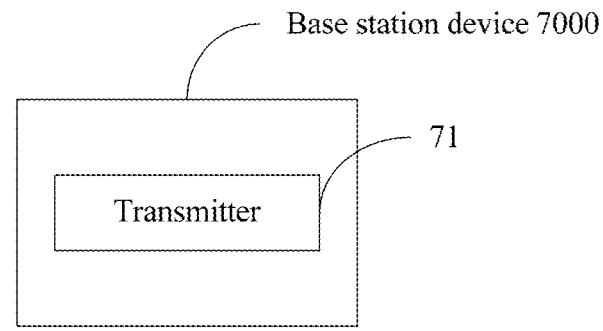
FIG. 21 is a schematic structural diagram of a base station device according to a thirteenth embodiment of the present invention.

FIG. 21 is a schematic structural diagram of a base station device according to a thirteenth embodiment of the present invention. The base station device is configured to implement the foregoing coding scheme determining function. As shown in FIG. 21, the base station device 7000 includes a transmitter 71.

The transmitter 71 is configured to send higher layer control signaling, physical layer control signaling, or a synchronization signal to a terminal device, where the higher layer control signaling, the physical layer control signaling, or the synchronization signal includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

As an implementation, the higher layer control signaling includes radio resource control RRC signaling, and the physical layer control signaling includes downlink control information DCI and uplink control information UCI.

As another implementation, the information block of bits includes at least one of the following information types: control information and data information.

According to the base station device provided in this embodiment of the present invention, the base station device sends, to the terminal device, the higher layer control signaling, the physical layer control signaling, or the synchronization signal that carries the coding scheme indication information, to indicate the coding scheme of the information block of bits. The terminal device and/or the base station device code/codes the information block of bits based on the indicated coding scheme, so that the base station device can clearly and flexibly indicate the coding scheme, thereby reducing signaling overheads caused by separately indicating the coding scheme.

Figure 22:
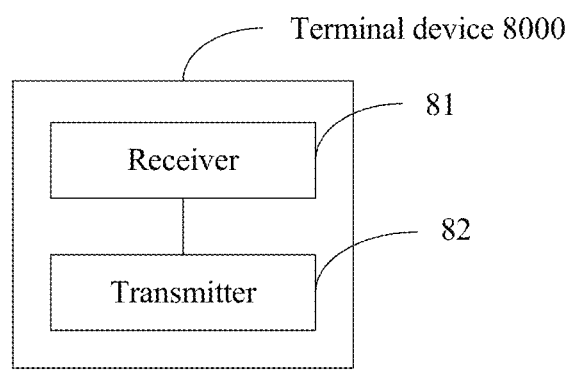
FIG. 22 is a schematic structural diagram of a terminal device according to a fourteenth embodiment of the present invention.

FIG. 22 is a schematic structural diagram of a terminal device according to a fourteenth embodiment of the present invention. The terminal device is configured to implement the foregoing coding scheme determining function. As shown in FIG. 22, the terminal device 8000 includes a receiver 81 and a transmitter 82.

The receiver 81 is configured to receive a capability negotiation request message of a base station device.

The transmitter 82 is configured to send a capability information report message to the base station device, where the capability information report message includes coding scheme indication information, the coding scheme indication information is used to indicate a coding scheme of an information block of bits, and the coding scheme includes at least one of the following coding types: polar codes, turbo codes, low-density parity-check LDPC codes, convolutional codes, block codes, and repetition codes.

In an implementation, the information block of bits includes at least one of the following information types: control information and data information.

According to the terminal device provided in this embodiment of the present invention, the terminal device returns, to the base station device, the capability information report message that carries the coding scheme indication information, to indicate the coding scheme. The base station device and/or the terminal device code/codes the information block of bits based on the indicated coding scheme, so that the terminal device can clearly and flexibly indicate the coding scheme, thereby reducing signaling overheads caused by separately indicating the coding scheme.

Figure 23:
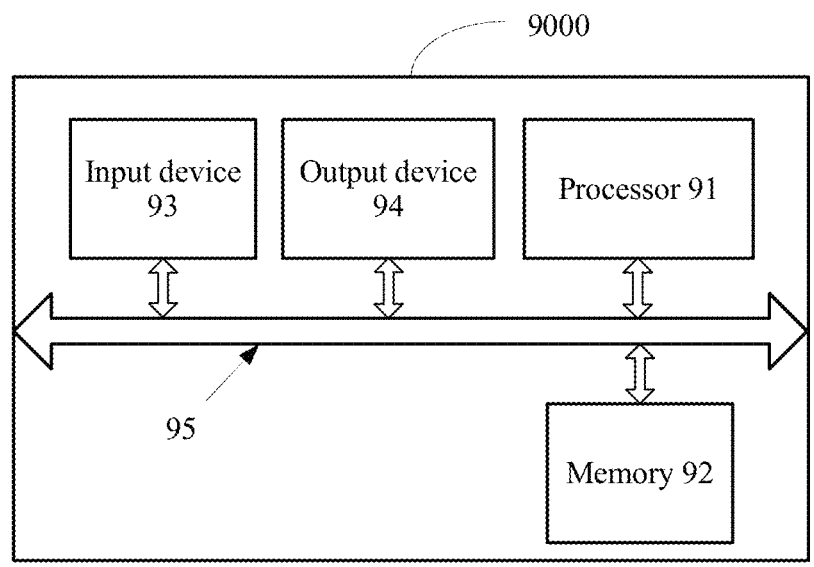
FIG. 23 is a schematic structural diagram of a coding scheme determining device according to a fifteenth embodiment of the present invention.

FIG. 23 is a schematic structural diagram of a coding scheme determining device according to a fifteenth embodiment of the present invention. The coding scheme determining device is configured to implement the foregoing coding scheme determining function. As shown in FIG. 23, the device 9000 includes a processor 91, a memory 92, an input device 93, an output device 94, and a bus system 95.

The processor 91 controls an operation of the coding scheme determining device 9000, and the processor 91 may also be referred to as a central processing unit (Central Processing Unit, CPU). The processor 91 may be an integrated circuit chip and has a signal processing capability. The processor 91 may be a general purpose processor, a digital signal processor (Digital Signal Processing, DSP), an application-specific integrated circuit (Application Specific Integrated Circuit, ASIC), a field programmable gate array (Field-Programmable Gate Array, FPGA) or another programmable logic component, a discrete gate or a transistor logic component, or a discrete hardware component. The general purpose processor may be a microprocessor, or the processor may be any conventional processor or the like.

The memory 92 may include a read-only memory and a random access memory, and provide an instruction and data to the processor 91. A part of the memory 92 may further include a non-volatile random access memory (NVRAM).

Various components of the coding scheme determining device 9000 are coupled by using the bus system 95, where the bus may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be one or more physical lines, and when the bus is a plurality of physical lines, the bus may be classified into an address bus, a data bus, a control bus, and the like. In some other embodiments of the present invention, the processor 91, the memory 92, the input device 93, and the output device 94 may also be directly connected by using a communications line.

The input device 93 may be specifically implemented as a mouse, a keyboard, a microphone, or the like. The output device 94 may be specifically implemented as a display, an audio device, or a video device. Certainly, functions of the input device 93 and the output device 94 may also be implemented by using an input/output device, for example, the input device 93 and the output device 94 are implemented as a touchable screen.

The processor 91 reads a computer program in the memory 92 to execute the following steps:

determining at least one information block size IBS that is greater than or equal to a preset first specified value X, where X is set based on a corresponding scenario, information type, and/or service type, and each scenario, information type, and/or service type is corresponding to at least one IBS; and selecting an IBS from the at least one IBS to code an information block of bits or a code block of the information block of bits, where the selected IBS is greater than or equal to a size of the information block of bits, and the IBS has a smallest difference from the size of the information block of bits; or the selected IBS is greater than or equal to a code block size CBS of the code block, and the IBS has a smallest difference from the CBS; where a coding scheme is determined by the scenario, information type, and/or service type, and the coding scheme includes at least one of the following coding types: polar codes, turbo codes, low-density parity-check LDPC codes, convolutional codes, block codes, and repetition codes.

In an implementation, each coding type is corresponding to one IBS set, each IBS set includes at least one IBS, and each IBS is corresponding to one coding scheme.

In another implementation, the processor 91 is further configured to execute the following step:

if the size of the information block of bits is greater than a preset second specified value Y, segmenting the information block of bits based on the second specified value and a principle that a quantity of padded bits is smallest, to obtain a plurality of code blocks of a same size, where Y is set based on a corresponding scenario, information type, and/or service type; and the step executed by the processor 91 of selecting an IBS from the at least one IBS to code a code block of the information block of bits includes:

selecting a first information block size IBS1 to code the plurality of code blocks, where the IBS1 is a sum of a code block size CBS of the code block and the quantity of padded bits, and the quantity of padded bits is an integer greater than or equal to 0.

In still another implementation, the processor 91 is further configured to execute the following step:

if the size of the information block of bits is greater than a preset third specified value Z, segmenting the information block of bits based on the third specified value and a principle that a quantity of padded bits is smallest, to obtain a plurality of code blocks of different sizes, where Z is set based on a corresponding scenario, information type, and/or service type; and the step executed by the processor 91 of selecting an IBS from the at least one IBS to code a code block of the information block of bits includes:

selecting a plurality of second information block sizes IBS2 to code the plurality of code blocks, where each IBS2 is a sum of a code block size CBS of each code block and the quantity of padded bits, and the quantity of padded bits is an integer greater than or equal to 0.

In yet another implementation, the processor 91 is further configured to execute the following step:

determining a selected LDPC code rate and a largest IBS of LDPC codes corresponding to the selected LDPC code rate; where the second specified value or the third specified value is the largest IBS of the LDPC codes corresponding to the selected LDPC code rate, and a coding type corresponding to the coding scheme is LDPC codes.

In still yet another implementation, the information block of bits includes at least one of the following information types: control information and data information.

According to the coding scheme determining device provided in this embodiment of the present invention, at least one IBS that is greater than or equal to the preset first specified value X is determined, and an IBS is selected from the at least one IBS to code the information block of bits or the code block of the information block of bits. X and the coding scheme are determined by a scenario, information type, and/or service type. In this way, a suitable coding scheme can be determined based on a scenario, information type, and/or service type. The information block of bits may further be segmented into the plurality of code blocks of a same size, and an information block size is used to code the plurality of code blocks obtained through segmentation. A segmentation manner is simple and the quantity of padded bits is smallest, thereby reducing bit padding overheads. The information block of bits may alternatively be segmented into the plurality of code blocks of different sizes, and a plurality of information block sizes are used to code the plurality of code blocks. In this way, coding schemes are diversified, coding can be flexibly performed, and the quantity of padded bits is smallest, thereby reducing bit padding overheads.

In the specification, claims, and accompanying drawings of the present invention, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A coding method, wherein the method comprises:
determining at least one information block size (IBS) that is greater than or equal to a preset first specified value X, wherein X is set based on at least one of corresponding scenario, information type, or service type, wherein the corresponding scenario, information type, or service type corresponds to at least one IBS; and
selecting an IBS from the at least one IBS to code an information block of bits or a code block of the information block of bits, wherein
the selected IBS is greater than or equal to a size of the information block of bits, and the IBS has a smallest difference from the size of the information block of bits; or
the selected IBS is greater than or equal to a code block size (CBS) of the code block, and the IBS has a smallest difference from the CBS; and, wherein a coding scheme is determined by the corresponding scenario, information type, and/or service type, wherein the coding scheme comprises at least one of the following coding types: polar codes, turbo codes, low-density parity-check LDPC codes, convolutional codes, block codes, and repetition codes.

2. The method according to claim 1, wherein each coding type corresponds to one IBS set, each IBS set comprises at least one IBS, and each IBS is corresponding to one coding scheme.

3. The method according to claim 1, wherein the method further comprises:
if the size of the information block of bits is greater than a preset second specified value Y, segmenting the information block of bits based on the second specified value using a least amount of padded bits, to obtain a plurality of code blocks of a same size, wherein Y is set based on a corresponding scenario, information type, and/or service type; and
the selecting an IBS from the at least one IBS to code a code block of the information block of bits comprises:
selecting a first information block size IBS1 to code the plurality of code blocks, wherein the IBS1 is a sum of a code block size CBS of the code block and the quantity of padded bits, and the quantity of padded bits is an integer greater than or equal to 0.

4. The method according to claim 3, wherein the method further comprises:
determining a selected LDPC code rate and a largest IBS of LDPC codes corresponding to the selected LDPC code rate; wherein
the second specified value or the third specified value is the largest IBS of the LDPC codes corresponding to the selected LDPC code rate, and a coding type corresponding to the coding scheme is LDPC codes.

5. The method according to claim 1, wherein the method further comprises:
if the size of the information block of bits is greater than a preset third specified value Z, segmenting the information block of bits based on the third specified value using a least amount of padded bits to obtain a plurality of code blocks of different sizes, wherein Z is set based on a corresponding scenario, information type, and/or service type; and, wherein
selecting the IBS from the at least one IBS to code the code block of the information block of bits comprises:
selecting a plurality of second information block sizes IBS2 to code the plurality of code blocks, wherein each IBS2 is a sum of a code block size CBS of each code block and the quantity of padded bits, and the quantity of padded bits is an integer greater than or equal to 0.

6. The method according to claim 1, wherein the information block of bits comprises at least one of the following information types: control information and data information.

7. A coding apparatus, wherein the apparatus comprises a processor and memory, wherein the processor is configured to execute a program stored in the memory to:
determine at least one information block size IBS that is greater than or equal to a preset first specified value X, wherein X is set based on at least one of a corresponding scenario: information type, or service type, and the corresponding scenario: information type, or service type corresponds to at least one IBS; and
select an IBS from the at least one IBS to code an information block of bits or a code block of the information block of bits, wherein
the selected IBS is greater than or equal to a size of the information block of bits, and the IBS has a smallest difference from the size of the information block of bits; or
the selected IBS is greater than or equal to a code block size CBS of the code block, and the IBS has a smallest difference from the CBS; and, wherein
a coding scheme is determined by the corresponding scenario, information type, and/or service type, and the coding scheme comprises at least one of the following coding types: polar codes, turbo codes, low-density parity-check LDPC codes, convolutional codes, block codes, or repetition codes.

8. The apparatus according to claim 7, wherein each coding type corresponds to one IBS set, each IBS set comprises at least one IBS, and each IBS is corresponding to one coding scheme.

9. The apparatus according to claim 7, wherein the processor is further configured to execute the program stored in the memory to:
if the size of the information block of bits is greater than a preset second specified value Y, segment the information block of bits based on the second specified values using a least amount of padded bits, to obtain a plurality of code blocks of a same size, wherein Y is set based on a corresponding scenario, information type, and/or service type; and
select a first information block size IBS1 to code the plurality of code blocks, wherein the IBS1 is a sum of a code block size CBS of the code block and the quantity of padded bits, and the quantity of padded bits is an integer greater than or equal to 0.

10. The apparatus according to claim 9, wherein the processor is further configured to execute a program stored in the memory to:
determine a selected LDPC code rate and a largest IBS of LDPC codes corresponding to the selected LDPC code rate; wherein
the second specified value or the third specified value is the largest IBS of the LDPC codes corresponding to the selected LDPC code rate, and a coding type corresponding to the coding scheme is LDPC codes.

11. The apparatus according to claim 7, wherein the processor is further configured to execute a program stored in the memory to:
if the size of the information block of bits is greater than a preset third specified value Z, segment the information block of bits based on the third specified value using a least amount of padded bits, to obtain a plurality of code blocks of different sizes, wherein Z is set based on a corresponding scenario, information type, and/or service type; and
select a plurality of second information block sizes IBS2 to code the plurality of code blocks, wherein each IBS2 is a sum of a code block size CBS of each code block and the quantity of padded bits, and the quantity of padded bits is an integer greater than or equal to 0.

12. The apparatus according to claim 7, wherein the information block of bits comprises at least one of the following information types: control information and data information.

* * * * *